United States Patent [19]

Swensen et al.

[11] Patent Number: 5,420,883

[45] Date of Patent: May 30, 1995

[54] TRAIN LOCATION AND CONTROL USING SPREAD SPECTRUM RADIO COMMUNICATIONS

[75] Inventors: Marvin D. Swensen; Gregory L. Mayhew, both of Fullerton; John G. Himes, Placentia; David S. Long, Chino Hills; James A. Kivett, Carson, all of Calif.

[73] Assignee: Hughes Aircraft Company, Los Angeles, Calif.

[21] Appl. No.: 63,097

[22] Filed: May 17, 1993

[51] Int. Cl.$^6$ ............................................. H04K 1/00
[52] U.S. Cl. ................................... 375/200; 342/450; 342/454; 342/455; 342/456; 342/457; 342/461
[58] Field of Search ..................... 375/1; 342/47, 386, 342/46, 450, 454, 455, 456, 457, 458, 459, 461, 463

[56] References Cited

U.S. PATENT DOCUMENTS

| | | | |
|---|---|---|---|
| 3,714,573 | 1/1973 | Grossman | 575/1 |
| 4,209,749 | 6/1980 | Becker et al. | 455/56 |
| 4,247,897 | 1/1981 | McDonald et al. | |
| 4,350,969 | 9/1982 | Greer | |
| 4,423,419 | 12/1983 | Johannessen | 343/452 |
| 4,445,118 | 4/1984 | Taylor et al. | 343/357 |
| 4,459,668 | 7/1984 | Inoue et al. | |
| 4,467,430 | 8/1984 | Even et al. | |
| 4,606,039 | 9/1986 | Nicholas et al. | |
| 4,641,243 | 2/1987 | Hartkopf et al. | |
| 4,665,404 | 5/1987 | Christy et al. | 372/463 |
| 4,711,418 | 12/1987 | Aver, Jr. et al. | |
| 4,799,062 | 1/1989 | Sanderford et al. | 342/450 |
| 4,879,713 | 11/1989 | Ichiyoshi | 342/457 |
| 4,994,969 | 2/1991 | Petit | |
| 5,036,478 | 7/1991 | MacDougall | |
| 5,048,052 | 9/1991 | Hamatsu et al. | |
| 5,157,408 | 10/1992 | Wagner et al. | 375/1 |
| 5,222,099 | 6/1993 | Hori et al. | 375/1 |

FOREIGN PATENT DOCUMENTS

WO88/01750  3/1988  WIPO.

OTHER PUBLICATIONS

"A 30 GHZ FSK-Transmission System for Automatic Train Control" G. F. Muller, Siemens, AG, Munich, *Digital Transmission in Wireless Systems,* Mar. 4–6, 1980, pp. C8.1–C8-4.

"Scientific and Technical Report-System Technical Description, For The Enhanced Position Location Reporting System (EPLARS) LRIP Program," dated 26 Feb. 1993, by Hughes Aircraft Company, Contract No. DAAB07-83-C-J031/P00114.

"Spread Spectrum for Commerical Communications," D. L. Schilling et al., IEEE Communications Magazine, Apr. 1991, pp. 66–79.

"Smart Highways," R. Jurgen, IEEE Spectrum, May 1991, pp. 26–36.

"Moving Block System with Continuous Train Detection Utilizing Train Shunting Impedance of Track Cir- (List continued on next page.)

Primary Examiner—David C. Cain
Attorney, Agent, or Firm—W. K. Denson-Low

[57] ABSTRACT

Communication devices and communication network techniques are employed to meet safety-critical, operational requirements for train location and control in railroad and public transit applications. On-board and trackside communication radios participate in a synchronous, time-slotted communication network, providing contentionless and highly responsive access to all participants. Encrypted, validated, and error protected communication links provide reliable and redundant transfer of information among the train, trackside, and control station radios. Spread spectrum communication techniques enable range measurements between all participants. These wireless communication links relay train range measurements to control or processing stations and relay control information (principally speed commands) from the processing stations to the trains. High resolution position location is determined along elevated, at-grade, and in-tunnel tracks using wireless methods and sparse device placement.

20 Claims, 16 Drawing Sheets

U.S. PATENT DOCUMENTS cuit," I. Watanabe and T. Takashige, Quarterly Reports of Railway Technical Research Institute, vol. 30, No. 4, Nov. 1989, pp. 190–197.

"Development for a New Electronic Blocking System," T. Sasaki, T. Wakabayashi, Quarterly Reports of Railway Technical Research Institute, vol. 20, No. 4, Nov. 1989, pp. 198–201.

"Vehicle Locator Uses Spread-Spectrum Technology," B. Xenakis and A. Evans, RF Design, Oct. 1992, pp. 58–65.

"Novel Train Control System Applicable to Railway Lines with Heavy Traffic," H. Oshima, K. Onozeki, Japanese Railway Engineering No. 110, Jun. 1989, pp. 1–4.

"Safety and Fault-tolerance in Computer-controlled Signalling Systems," K. Akita, H. Nakamura, QR of RTRI, vol. 31, No. 2, May 1990, pp. 95–103.

"Innovative Train Control System by Radio," Y. Hasegawa, QR of RTRI, vol. 30, No. 4, Nov. 1989, pp. 181–189.

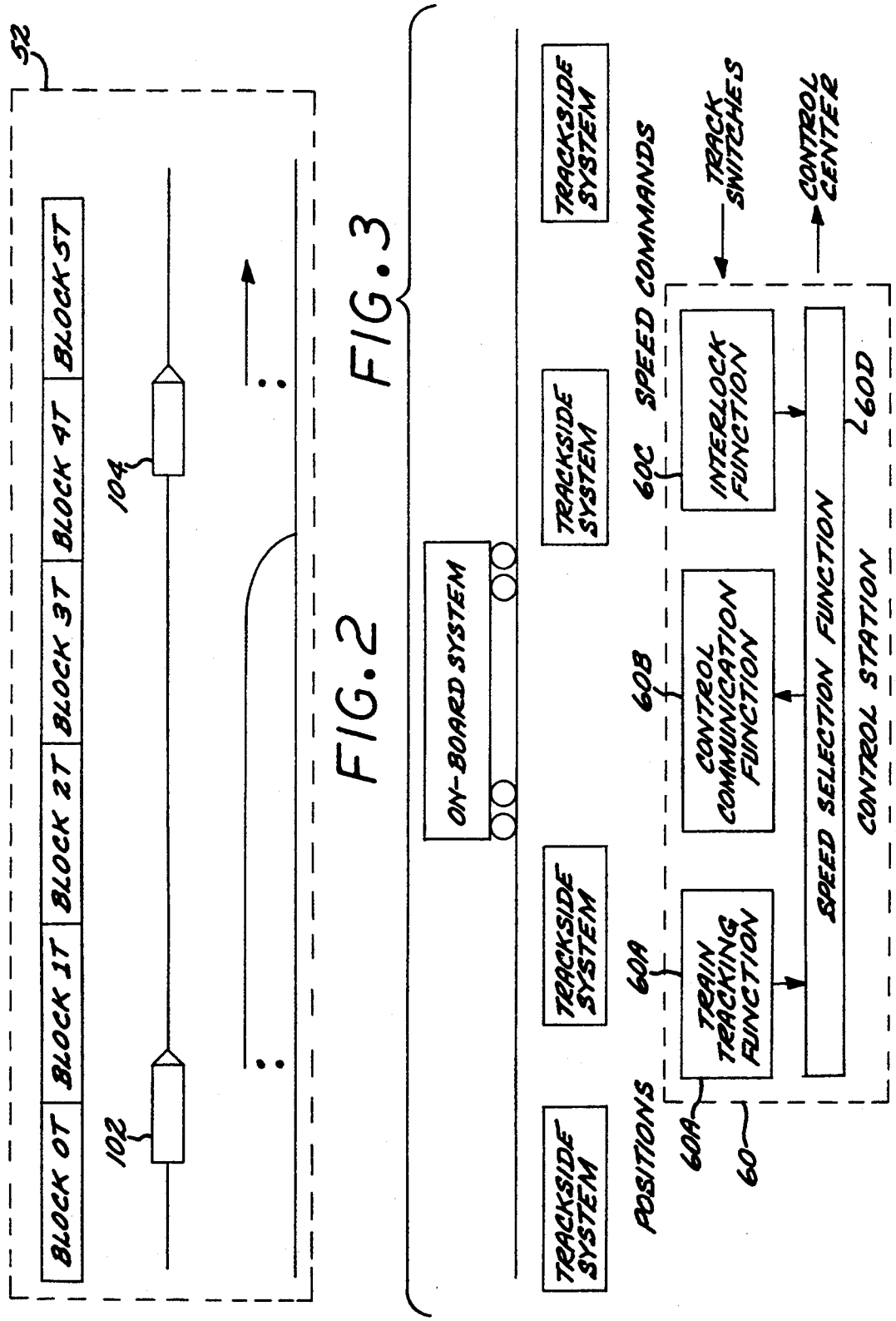

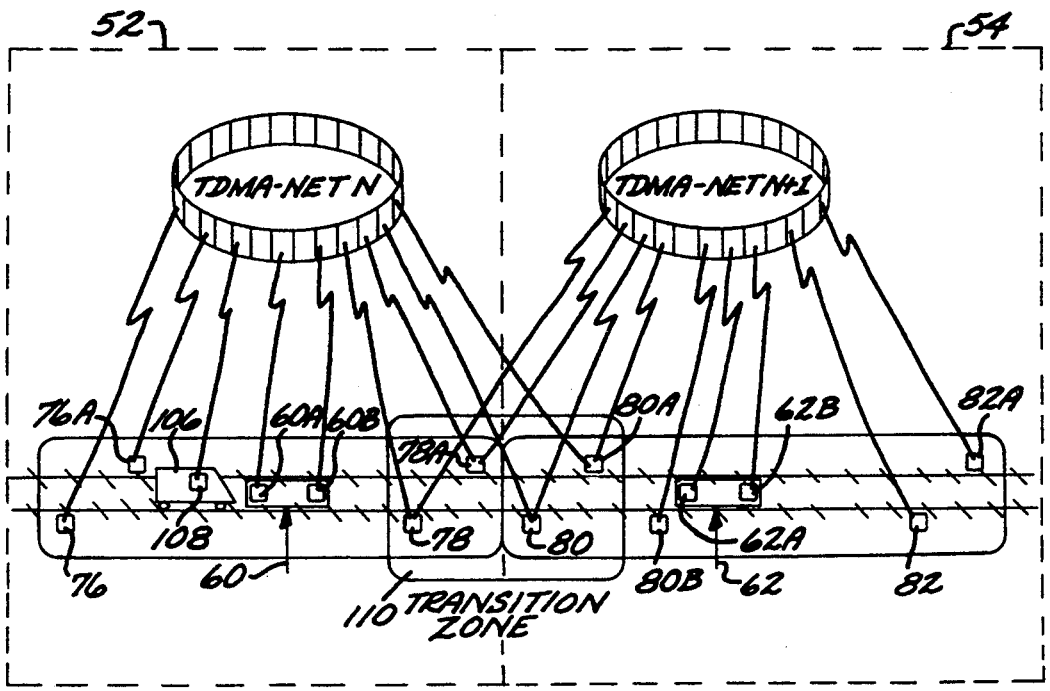
FIG.4
FIG.5
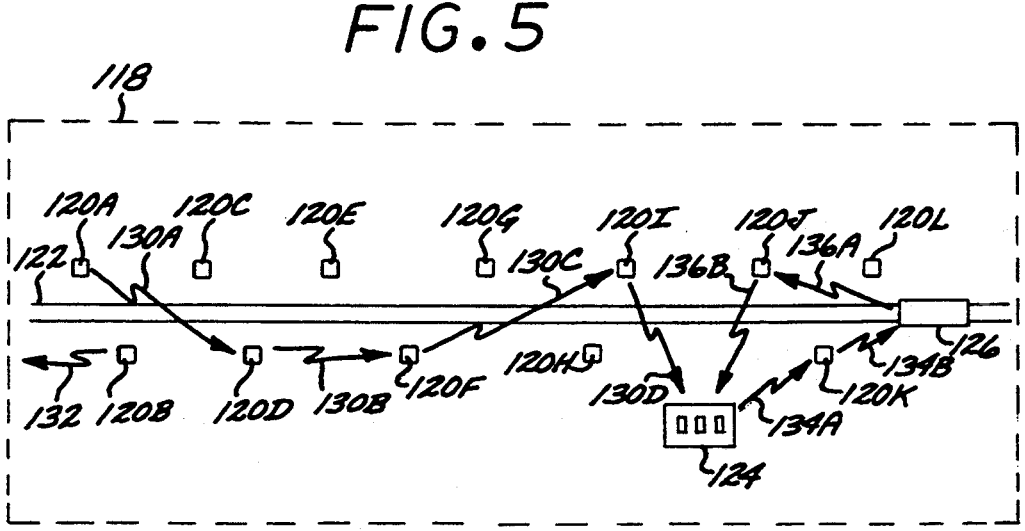

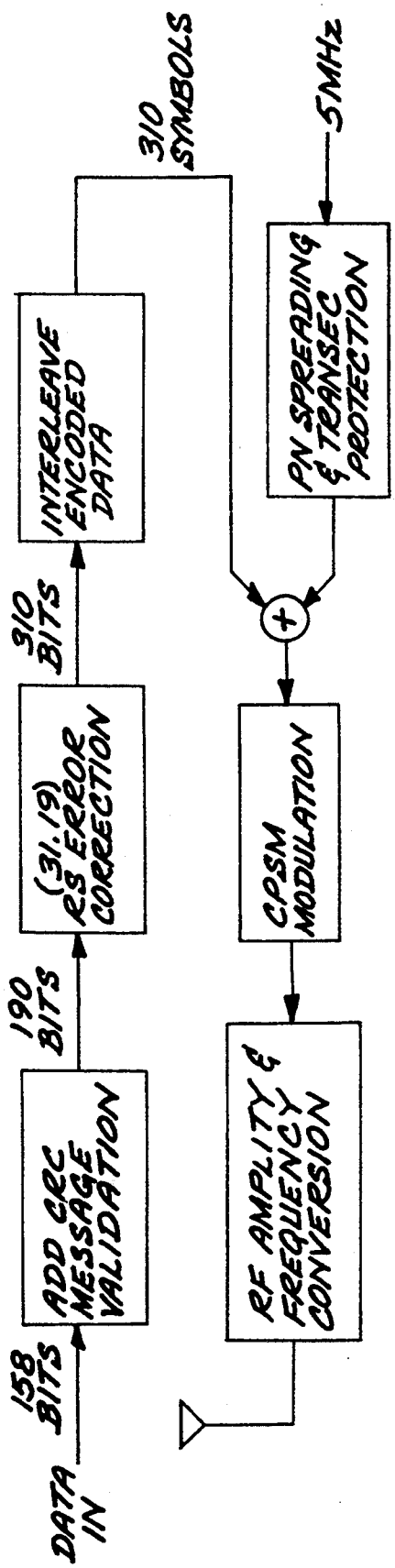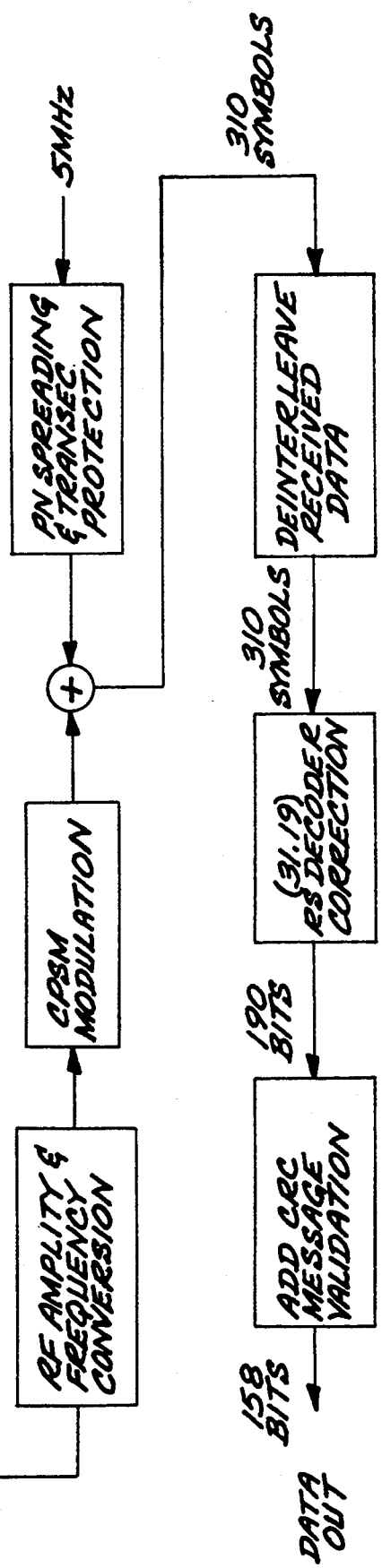
FIG.6
FIG.7

| 384 SLOTS PER 0.5 SEC. FRAME | | | | |
|---|---|---|---|---|
| NET SYNC/CONTROL | OUTBOUND COMMANDS | TRAIN TRANSMISSION | INBOUND RANGE REPORT MESSAGE | TRANSITION ZONE COMMUNICATION |
| 30 SLOTS | 34 SLOTS | 128 SLOTS (ONE EACH FOR 128 TRAINS) | 160 SLOTS (NORMAL 256 RANGE REPORTS EVERY FRAME) | 32 SLOTS (2 TRANSITION ZONES; 3TX/RX EACH) |

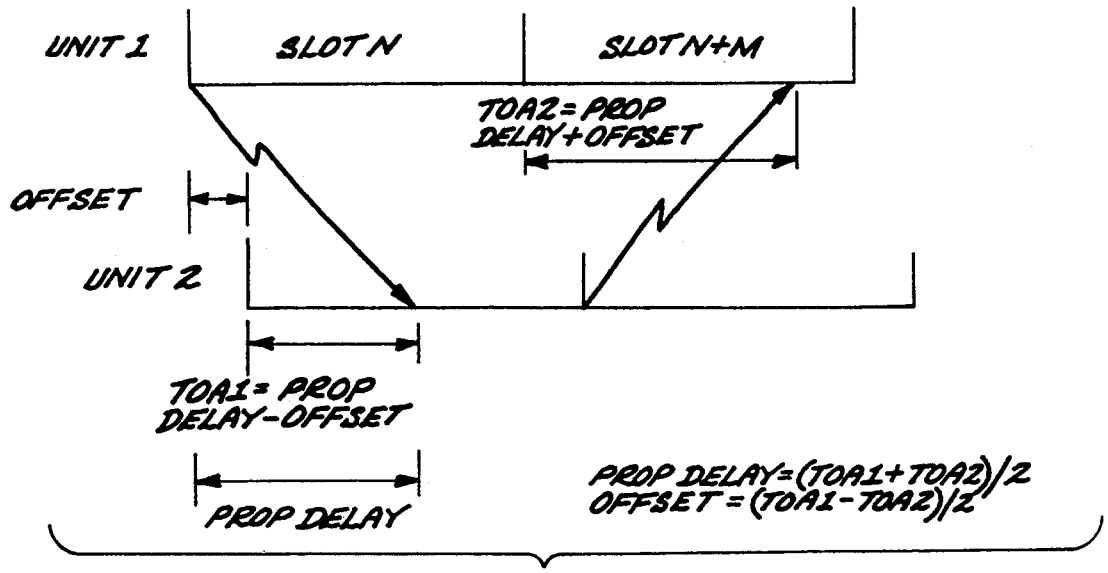
FIG. 14
FIG. 15
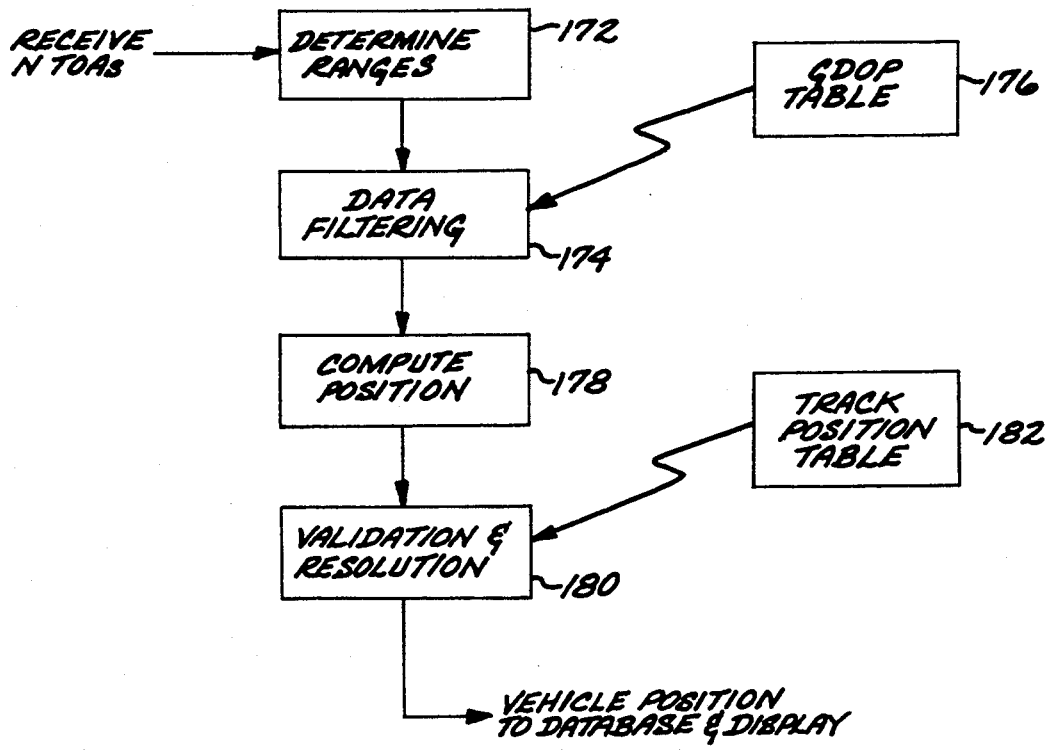

TRAIN LOCATION AND CONTROL USING SPREAD SPECTRUM RADIO COMMUNICATIONS

BACKGROUND OF THE INVENTION

The present invention relates to systems for determining the locations of moving trains and for transmitting command information to such trains from control stations.

As greater metropolitan areas grow larger and people are commuting greater distances to job centers, public transportation becomes a more desirable alternative to commuting in a personal vehicle. The traditional response in transportation systems to increased usage has been to increase the amount of infrastructure. However, in light rail transit systems, adding parallel track lanes to existing lines is neither cost effective nor typically possible. Rather, the desirable approach is to increase the capacity over existing infrastructure without sacrificing efficiency or safety.

Traffic demand is increasing rapidly, but reinforcement of railway facilities is proceeding slowly. For a subway system, improving the effectiveness of the transportation system means minimizing the headway intervals between two successive trains on the same line. Inherent in the control process to minimize these intervals is the accurate, real-time position location of all trains under conditions with high ambient interference. To satisfy these resolution requirements, conventional detection and signalling methods require placement of sensors and communication devices at short intervals along the tracks resulting in expensive installation and maintenance costs.

Historically, the safety of railway signalling systems has been ensured by means of fail-safe electromagnetic relays. As traffic densities increased, designers of conventional signalling systems have reluctantly incorporated more capable fail-safe electronic equipment. However, conventional signalling systems are now having difficulty providing train position resolution and rapid control communication response capabilities which satisfy newer headway minimization and regenerative braking functions at an affordable cost.

Conventional signalling systems use various combinations of four different train tracking approaches and three different levels of on-board automation. In three of these tracking approaches, tag readers, dead reckoning, and the Global Positioning System, the train determines its own position and then reports its position to the control station. This method supports semiautomatic control in which each train regulates the interval between it and the preceding train. In the traditional approach employing inductive loops, each train's position is determined directly at the control station. This method supports both manual and automatic control. In the New York subway system, humans operate the train in response to presented movement commands. In the Japanese Railway system, automatic train control systems implement the movement commands.

The railroad and transit communities are interested in wireless methods for tracking trains because interlock and electronic blocking equipment account for ⅓ of the total system costs. Similarly, track circuits, signal cables, and grade crossings account for ⅓ of the total system costs. Thus, wayside signalling devices typically constitute over fifty percent of any system's construction costs.

The Railway Technical Research Institute of Japan has concluded that conventional signalling systems will be unable to safely minimize intervals between trains with variable speeds and dwell times on high density lines. Conventional train location processes essentially perform discrete detection at coarse intervals. However, to reduce headway intervals below two minutes as required on high speed and/or high density lines, continuous detection of train locations will be necessary. Furthermore, train positions must be accurate to within 15 feet to support the necessary responsiveness in this real-time control process.

Accurate train tracking, centralized position location, and automatic train control can all be combined to also support regenerative braking. In regenerative braking, one trains' braking is coordinated with another train's acceleration so that external power consumption is minimized. Regenerative braking will also require a communication function which emphasizes rapid responses over data throughput in this real-time control process.

One known technique for train control employs inductive loops, which provide position accuracy to the loop length but loops are typically no shorter than 100 feet, and usually 1000 feet in length, because these loops must continuously exist for the entire track resulting in high installation and maintenance costs. Inductive loops can be used for data communications from the control station to the train but depend on physical contact between the rails and the wheels, so position determination and communications are easily disrupted by rusty rails, oil contamination, and propulsion motor noise.

Tag systems, typically microwave or infrared based, provide locations when the train is in the immediate vicinity of the transponder. Transponders must be installed at intervals equivalent to the position accuracy required or dead reckoning systems are required to interpolate positions. However, train position information is only available on the trains rather than at the control station. Furthermore, tagging systems do not provide communication between the train and control station.

Dead reckoning systems depend on counting axial rotation to determine position. Wheel slip, wheel race, and wheel wear all contribute significantly to position inaccuracy. Short range errors are estimated by software models and long range accumulated errors can only be removed by recalibration from a companion tagging system. However, train position information is only available on the trains rather than at the control station. Furthermore, dead reckoning systems do not provide communication between the train and control station.

The Global Positioning System (GPS) is a satellite based location system. GPS does provide accurate locations. However, train position information is only available on the trains rather than at the control station. Furthermore, GPS is not available in tunnels and does not provide communications between the train and control station.

SUMMARY OF THE INVENTION

This invention has two primary purposes. The first primary purpose is to determine in a cost effective manner the real time positions of moving trains with much higher resolution than previously attainable. The second primary purpose is to reliably and robustly transfer safety-critical, command information from control stations to the trains with much higher data rates than previously attainable. Systems embodying the invention also have inherent secondary capabilities. The communication links can also be used to transfer more detailed status information from the trains to the control stations. Furthermore, the communication links can be used to transfer more detailed command information from the control stations to the trains.

This invention provides many advantages over conventional train signalling and control systems. Systems embodying the invention can provide faster response times and higher data rates, do not require physical contact with the train, use minimal devices trackside, function in tunnels, maintain accuracy along curves, do not require system shutdown to perform device maintenance, use readily available hardware components, and are less sensitive to noise interference. Such systems can overlay and complement existing fixed block train control systems.

Systems operating in accordance with the invention can provide capabilities which are necessary in order for transit systems to perform two major functions. These two major functions are headway minimization and regenerative braking. Accurate real time location of moving trains is a prerequisite to increasing traffic density to meet ridership demands without sacrificing safety. Contentionless, high rate, real time communications with trains is a prerequisite to coordinating one train's braking with another train's acceleration so that external power consumption is minimized. These functions must be performed in the future so that transit systems make efficient use of their infrastructure and resources and continue to be viable economic entities.

BRIEF DESCRIPTION OF THE DRAWING

These and other features and advantages of the present invention will become more apparent from the following detailed description of an exemplary embodiment thereof, as illustrated in the accompanying drawings, in which:

FIG. 2 is a schematic diagram illustrating the division of the system control zones into blocks, and the control of successive trains within the various zones.

FIG. 3 illustrates the functions performed by the control stations for each control zone of the system shown in FIG. 1.

FIG. 4 illustrates the time division multiple access communications networks for each control zone.

FIG. 5 is a schematic diagram illustrating the data distribution performed by the system of FIG. 1.

FIGS. 6 and 7 are block diagrams illustrating the functional processing of an exemplary burst transmission employed in the system of FIG. 1.

FIG. 14 illustrates train range determination based on time of arrival measurements.

FIG. 15 is a simplified flow diagram illustrative of a method for determining train position from the range data.

DETAILED DESCRIPTION OF THE PREFERRED EMBODIMENT

In accordance with this invention, communication devices and communication network techniques are combined to meet safety-critical, operational requirements for train location and control in railroad and public transit applications. On-board and trackside communication radios participate in a synchronous, time-slotted communication network providing contentionless and highly responsive access to all participants. Encrypted, validated, and error protected communication links provide reliable and redundant transfer of information among the train, trackside, and control station radios. Spread spectrum communication techniques enable range measurements of the trains. These communication links relay train range measurements to control or processing stations and relay control information (principally speed commands) from the processing stations to the train using far higher data rates than induction methods. High resolution position location is determined along elevated, at-grade, and in-tunnel tracks using wireless methods and sparse device placement. Device placement is sparse in that, rather than having devices such as wire loops running along the entire length of the track, radios are placed at discrete intervals, where the distance length of the intervals between radios generally ranges from ¼ mile to 1 mile.

Figure 1:
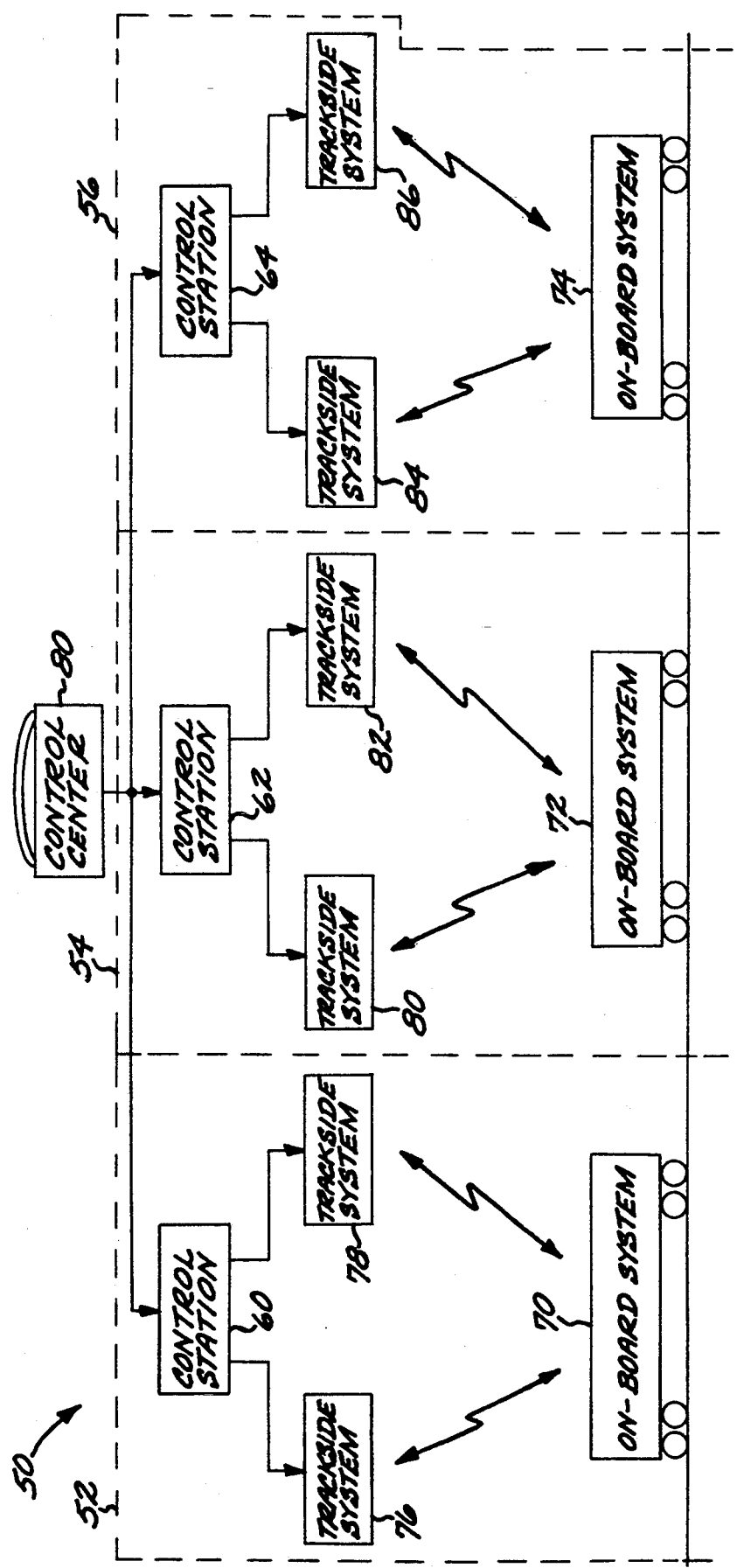
FIG. 1 is a schematic diagram illustrating an exemplary architecture for a light rail public mass transit control system in accordance with this invention.

Railroad and public transit control systems in accordance with the invention are based on the distributed control architecture shown in FIG. 1. The entire transportation corridor is divided into control zones, in this example zones 52, 54, 56. A control station 60, 62, 64 within each respective control zone directs all trains within that zone, and is independently responsible for ensuring system safety in its zone. Each control zone performs a series of hand shakes with its neighbors before allowing a train to enter or leave the adjacent control zone.

The system 50 further includes a plurality of sparsely dispersed trackside systems 76, 78, 80, 82, 84 and 86 along the track system. Each trackside system includes a spread spectrum radio set and antenna, for communication with other trackside systems, the on-board communication systems 70, 72 and 74 located on the trains, and with the control stations 60, 62 and 64. The on-board communication systems also include spread spectrum radios and antennas.

Each control station 60, 62 and 64 further divides its control zone into blocks. As shown in FIG. 2, all train movement commands issued by the control station must guarantee that each train gradually but completely stops prior to the beginning of any occupied block along its path. In the example of FIG. 2, zone 52 is divided into fixed track block segments 0T-5T. On-board systems 70, 72, 74 convert the movement commands issued by the control station into specific control signals for the train's motors, brakes and doors in accordance with established speed profiles. Thus, for example, if train 102 is following train 104, which is stopped in block 4T, then train 102 must be brought to a complete stop prior to the beginning of block 4T. In a general sense, the train control shown in FIG. 2 is known in the art.

The control center 80 monitors status information concerning vital power and train locations throughout the entire system. The control center 80 handles special situations requiring global system knowledge by apprising all control stations 60, 62, 64 of any required changes in normal routines.

FIG. 3 illustrates components of a typical control station 60. The train tracking function 60A traditionally determines the block occupancies which are equated to train positions. The control communication function 60B transfers the movement commands from the speed selection function to each of the trains. The interlock function 60C performs and verifies all track switch settings. The speed selection function 60D uses all trains' relative positions and all switch settings to continuously determine the safe operational speed for each train.

This invention is specifically directed to performing the train tracking and control communication functions 60A and 60B within a typical system. This invention can be used either as an independent replacement or as an overlay of existing systems for greater precision and redundant communication protection.

As shown in FIG. 4, the system architecture comprises a collection of spread spectrum radios, comprising the trackside stations, the on-board communications systems, the control stations, and the central control station, participating in a time division multiple access (TDMA) communications network. Each control zone has its own synchronized communications network, thereby maintaining the distributed control architecture of transit systems. The number of control zones is not limited. All control zone networks are synchronized to a single time to facilitate train transfer through transition zones. For redundancy, each train 102, 104 has at least one radio on the lead car and one radio on the tail car. Trackside radios comprising the trackside stations 76, 78, 80, 82, 84 and 86 are installed at surveyed positions, with approximately one-quarter mile intervals to accommodate propagation around curves in tunnels and to support multiple levels of relays in the event of single radio failure. Each control station includes two radios to support communication up and down the track.

The control station uses the position reports about each train's location to determine the safe operational speed of each train. Due to curves in tunnels or signal attenuation due to the presence of a train, a control station may not have a direct link to a particular train or a particular trackside (wayside) radio. For speed control commands which go from the control stations to the trains, if necessary, the control station will communicate the speed command using its radio to the trackside radios nearest to it, as designated "level A" radios in FIG. 9. The radios designated in level A will retransmit this same message in a later time slot to the radios in the next interval distance farther away from the control station, as designated "level B" radios in FIG. 12. Similarly, radios designated in level B retransmit to level C radios in a later time slot and then radios designated in level C retransmit to level D radios in a later time slot. Each train thus has four opportunities to receive any command intended for that train, because the control station radio, a Level A radio, a level B radio, and a level C radio have each transmitted the message once.

For position reports which go from the wayside radios to the control station, every trackside (wayside) radio listens for any transmissions from any train. To guarantee that the control station receives every transmission from every train, each trackside radio retransmits a message received from a train to the trackside radio that is in the next interval distance closer to the control station. This radio in turn retransmits this message in a later time slot to the trackside radio that is its next interval distance closest to the control station. This process continues until the radios in the designated A level transmit to the control station all messages which they have received from either trains directly or from retransmissions by other trackside radios.

Each radio has a double horn directional antenna. One horn points up the track and the other horn points down the track. This antenna arrangement provides signal gain over an omni-directional antenna. The type of antenna used is not critical to the invention. Rather the antenna facilitates communication between the trackside, on-train, and control station radios. The control station has two radios to provide full service redundancy in case either one of the control station radios fail.

FIG. 4 shows two illustrative control zone TDMA networks N and N+1, corresponding to control zones N and N+1, e.g., zones 52 and 54. Zone 52 includes wayside stations 76, 76A, 78, 78A, each comprising trackside radios which participate in the TDMA network N. Control station 60 includes two radios, 60A and 60B, each of which participates in the TDMA network N. Train 106 is schematically shown with radio 108, also participating in the TDMA network N. Similarly, zone 54 includes trackside stations 80, 80A, 80B, 82 and 82A, each including a radio which participates in the network N+1. The control station 62 includes two radios 62A and 62B which participate in the network N+1. Each radio is allocated a particular time slot in which to send or receive a spread spectrum message. In this exemplary embodiment, each TDMA network N and N+1 cycles through every time slot every half second. A transition zone 110 encompasses the border between the zones 52 and 54, and includes wayside stations 78, 78A, 80 and 80A. Train position location measurements, i.e. measurements of the range of a train from particular wayside stations, from the transition zone are reported to both control stations 60 and 62, and a smooth transition of control over a train in the transition zone is coordinated.

Each control station radio performs several TDMA network functions, including synchronization, formation, monitoring, and interfacing to the speed code selection subsystem 60D.

Each radio comprising a trackside station performs several functions, including train range calculation, TDMA network acquisition, train speed command communication, maintenance of network synchronization, and transition zone communication.

Each radio comprising the train on-board communications system performs the function of train length determination, network acquisition, maintenance of network synchronization and train speed acquisition interface to the on-board automatic train controller ("ATC"). Train length determination is by radio ranging between the radio sets at opposite ends of the train. Train length is also available (in some systems) through separate on-board equipment which determines the number of train cars and combines this information with the known length of the cars. The on-board automatic train controller subsystem implements the movement commands issued by the control station and enforces equipment safety procedures. Movement commands are converted to specific control signals for the train's electric motors, brakes, and passenger doors in accordance with established speed profiles and procedures. Fail safe operation includes proper action, such as gradually stopping the train, in response to loss of propulsion power and loss of communications with the control station.

Each control zone TDMA network has five categories of data distribution requirements: (1) network synchronization and control, (2) outbound command from the control station radio to the trackside and train radios, (3) train transmissions, (4) inbound range reports from the trackside radios to the control station radios, and (5) transition zone communications. This general process is illustrated in FIG. 5. Here, trackside station radios 120A–120L are sparsely dispersed along the track 122 comprising zone 118. A control station 124 includes at least one radio. A train passing through the zone includes an on-board radio 126. Range reports regarding the train are communicated to and from the neighboring control zone; such communication is indicated by an incoming report received at trackside radio 120A and passed on toward the control station radio via a relay link made up of the intervening trackside radios, e.g., radios 120D, 120F, 120I, as shown by propagation arrows 130A–130D. Range reports are sent to the neighboring control zone, as shown by propagation arrow 132. Speed control commands are sent from the control station 124 to the train radio 126 via a trackside relay link, as shown by propagation arrows 134A and 134B. Status reports are sent from the train radio 126 to the control station 124 via a trackside link, as shown by propagation arrows 136A and 136B.

An exemplary spread spectrum waveform suitable for the system 50 is designed as an integrated, synchronous time ordered structure to provide good interference rejection performance, multiple access communication, accurate range measurement, digital error correction, message validation, and data security of all link messages. Reliable data delivery and accurate position location both build upon a robust point-to-point data link between pairs of radio sets. These individual data links are combined to form network connections. Together message, waveform, and network designs provide all of these features by using the field proven techniques and technologies of the EPLRS radio sets, described in the "Scientific and Technical Report-System Technical Description, For The Enhanced Position Location Reporting System (EPLARS) LRIP Program," dated 26 Feb. 1993, by Hughes Aircraft Company, Contract No. DAAB07-83-C-J031/P00114. These techniques and technologies were developed to overcome high levels of intentional jamming in military communications and, hence, can provide high interference rejection for data links in the open elevated and at-grade portions a track system as well as undistorted communications in the tunnel portions.

The functional processing of an exemplary burst transmission employed in the TDMA networks of the system 50 is shown in FIG. 6. Digital host data in groups of 158 bits are input to the validation encoding logic. The message validation encoding process uses a cyclic redundancy checking (CRC) algorithm to generate 32 parity bits which are appended to the host data bits. The encrypted 190 bits are processed in two sets of 95 bits by the Reed Solomon encoder. The encoder adds 60 parity bits to each of the 95 bits resulting in two (31, 19) codewords. These 310 symbols are interleaved to minimize any effects from a burst interference during actual transmission. After interleaving, the PN code spreads the data symbols by 21 chips per symbol for additional noise immunity. The PN spreading code also performs as a security code to protect each message transmission from tampering or spoofing. This data stream is CPSM modulated, amplified, and frequency converted to the 2.4–2.485 GHz band. The corresponding data receiving process is shown in FIG. 7.

In order to demodulate the message data, the receiver must first detect the presence of the signal and acquire message timing. The preamble is a special pattern at the beginning of each message. The special preamble pattern is detected using a correlator. The correlator is essentially measuring the presence of energy. When sufficient energy is detected, the correlator declares the presence of a message and then other portions of the receiver begin to demodulate the data. A long preamble makes it easier for the correlator to detect the preamble. However, the correlator and synchronization circuitry are the most expensive hardware portions of any digital receiver, so the required false alarm rate ultimately determines the maximum preamble length. The radio sets in this exemplary embodiment use a preamble with 512 "preamble bits" or chips, and also have an adjustable correlation threshold. Hence, the preamble detection threshold can be set such that in only 1 out of 5,000 opportunities for message reception does noise alone trigger the demodulation process. Should this occur, the Reed Solomon and CRC codes eliminate this "false data" before it is ever presented to the ATC system.

Each transmission within a time slot uses a direct sequence spread spectrum waveform. This digital transmission technique provides two features important to typical train system communication links, ranging and interference rejection, which are not possible using traditional analog transmission techniques such as FM. The amount of interference reflection afforded by a direct sequence spread spectrum system is the processing gain. A spread spectrum system develops its processing gain by the sequential steps of spreading and despreading. At the transmitter, the higher rate chipping signal modulates the data into a spectrum which is larger due to the auxiliary modulation. At the receiver, despreading is accomplished by correlating the received signal, containing desired and interfering components, with a local reference spreading code. When the two signals are compared, the desired signal collapses into its original baseband width, whereas any unmatched input (noise) is spread in bandwidth and reduced in amplitude. A filter then selects only the desired narrowband baseband signal. At 21 bits of spreading per encoded symbol, the spread spectrum receiver enhances the desired signal while suppressing the effects of all other signals by 13.2 dB.

Error free user data is obtained by incorporating a powerful forward error correction code (FEC) into the transmission. The communication link operates without interruption and the error control is thus transparent to all other levels of the system. In FECS redundancy bits are calculated in an organized manner so that the locations and magnitudes or errors can be calculated at the receiver. Hamming, Golay, and BCH codes are easy to implement but do not correct many errors. Reed Solomon codes are more difficult to implement but correct many errors. Besides error correction capability, these codes are also characterized by their dB improvement in bit error probabilities, their probability of undetected decoding error, and the probability of undetected decoding failure.

The (31, 19) Reed Solomon codeword corrects a mixture of individual errors and burst errors. This code corrects 6 symbol errors, but since each symbol is 5 bits long, these errors can be a mixture of individual errors and bursts up to length 5. Thus, up to 19% of the message can be destroyed and the message will still be interpreted correctly. In digital communication systems, standard operating points for voice is $10^{-3}$ bit error rate and for data is $10^{-5}$ bit error rate. Without any FEC, the minimum signal strength at the demodulator must be 9.8 dB. Due to the Reed Solomon error correction code, only 7.3 dB signal-to-noise ratio is required to achieve the same performance. If the signal strength is higher than 7.3 dB, then the error rate will be significantly less, thus assuring error free transmission.

Each message within a time slot contains network, command, or ranging information. Because this information is controlling train functions, this information is protected by both message validation and error correction coding to satisfy the system safety requirements. A potential hazard exists if the message is received in error but the error is not detected and hence not corrected. The message validation CRC and the Reed Solomon error correction codes each have their own undetected error rates. The system undetected error rate is then the product of these individual undetected error rates. For a message error to remain undetected, this error must be undetected by the error correction code and then undetected by the CRC which is performed on the corrected message.

Message validation is obtained by incorporating a CRC error detection into the transmission. The transmitter treats the digital data as if it was a digital number. The CRC process divides this message by a special number and computes a remainder. The remainder is appended to the user data and included in the message. The receiver computes its own remainder on the received data and compares the computed remainder with the received remainder. If the remainders do not agree, then the message is rejected thus assuring message reliability. The CRC remainder is protected by the FEC; otherwise uncorrected transmission errors in the CRC portion would cause the rejection of corrected error free host data. The international Standards Organization has selected special Length 32 CRCs after special testing. Specifically, these validation codes detect all odd number of errors, detect all even number of errors less than 16, detect all burst errors of length 32 or less, and detect 99.6 percent of all longer burst errors. Basically, a "corrected" message which still has errors has less than one chance in $2^{32}$ or a probability of $2.33 \cdot 10^{-10}$ that it will pass the message validation CRC code without being detected.

A combination of direct sequence pseudo noise spread spectrum with multiple frequency channels available for increased flexibility and capacity are suited for use in this invention.

In one exemplary embodiment, six message types are used for the communications network, as indicated in Table I, each fulfilling a specific purpose. The first two types, the network acquisition and network acquisition response messages, are used for initial network acquisition. The Network Synchronization Message is used for precisely maintaining network synchronization.. The Inter-Station Message is used by adjacent control stations for coordination of train positions and train control handoff. The Command Message and Report Message are used for control stations to train (outbound) and train-to-control station (inbound) traffic, respectively. These last two message types are the most used, and they contain specific, train-system-specified, data fields.

TABLE I

| RF LINK MESSAGE TYPES | | | |
|---|---|---|---|
| Message Type | Outbound | Inbound | Special |
| Network Acquisition Message | | | x |
| Network Acquisition Response Message | | | x |
| Network Synchronization Message | x | x | |
| Inter-Station Message | x | x | |
| Command Message | x | | |
| Report Message | | x | |

Except for initial network acquisition, in this embodiment all RF link message are 152 bits long. This 152 bits is in addition to any error correction and residual error detection coding.

Figure 8:
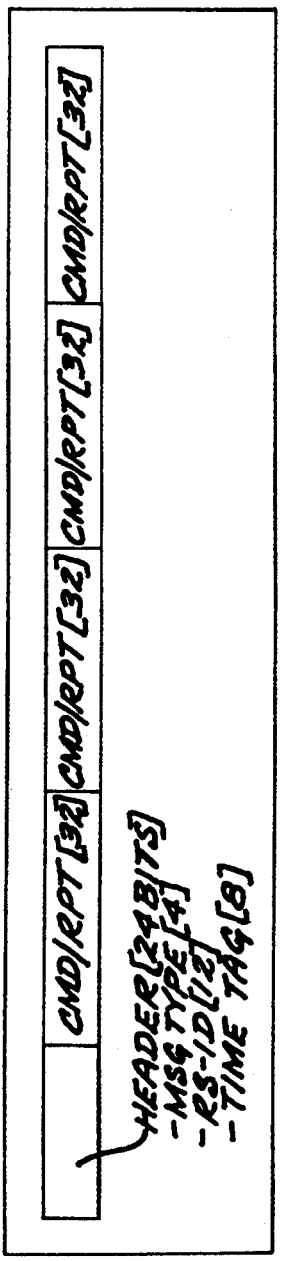
FIG. 8 illustrates a general message format for the system of FIG. 1.

All of the formats have been adjusted to maximize efficiency of handling by the microprocessor used in the radio sets (RSs). This also leads to fewer potential errors and easier data analysis, and it thereby improves system safety. For most messages, the 152 data bits consists of a 24 bit header and four 32 bit report or command fields, as shown in FIG. 8.

For all messages outbound from the control center, the RS ID in the message header is that of the transmitting RS, and the time tag is the message originated time tag (MOTT). The MOTT is set by the network management function, and it identifies the system time at which the control station issued the command message.

Figure 9:
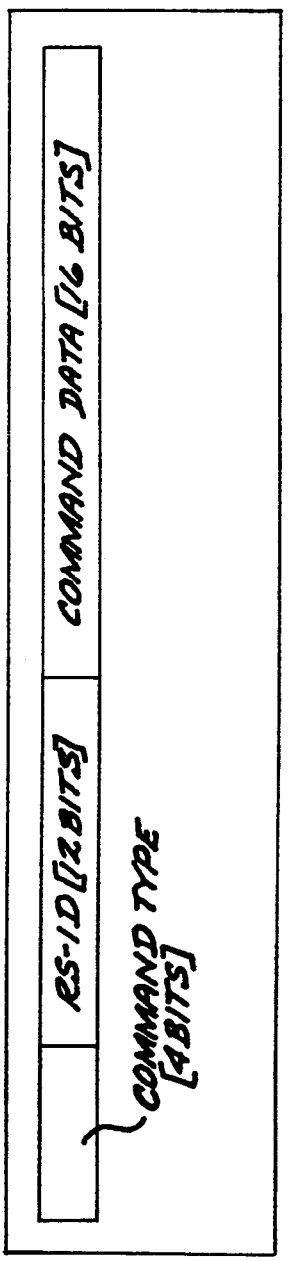
FIG. 9 shows a general command message format.

Commands within the command message may be addressed to different RSs and, thus, they have individual RS IDs. FIG. 9 contains the general format for an individual command field. The RS ID in the command is set by the originating function, e.g., the RS IDs in speed commands are set by the speed code selection function, and the RS IDs in network assignment commands are set by the network management function. Once the 32 bit command is built, it is never modified until it reaches the intended unit.

A relay RS never modifies the content of a command message. If any part of the message fails one of the error checks or one of the data content checks, the entire message is rejected.

Figure 10:
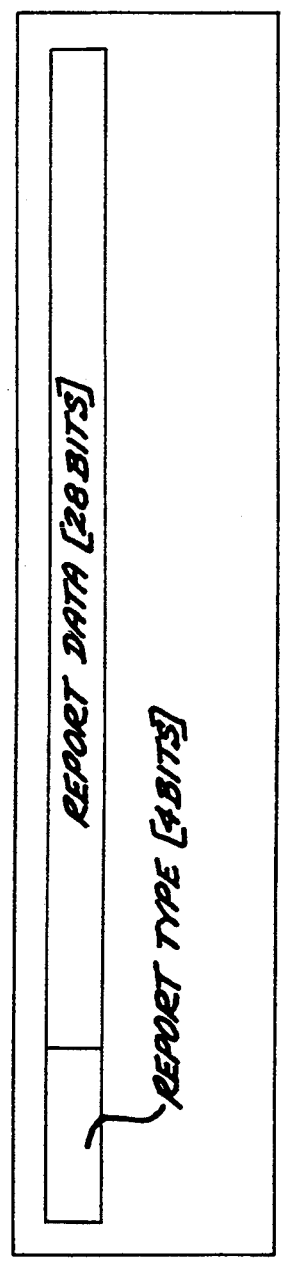
FIG. 10 illustrates the general format for an individual report field for the system of FIG. 1.
Figure 11:
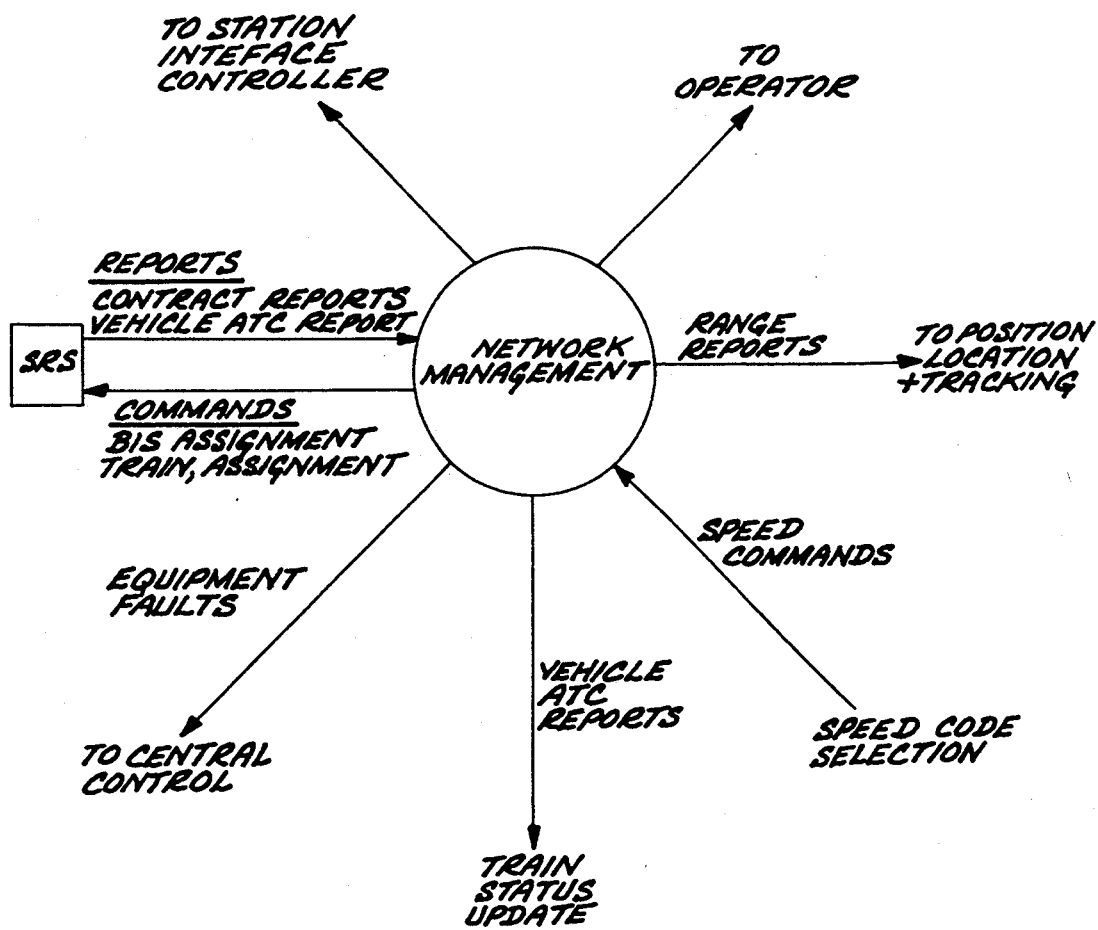
FIG. 11 is a schematic diagram illustrating network management functions performed by the system of FIG. 1.

FIG. 10 contains the general format for an individual report field. For all inbound report messages the message RS ID is set to be the originating RS, and it is not modified by the relay RSs. Also, the time tag is set by the originating function. For train reports, this time tag is the MOTT of the last speed command accepted by the train ATC.

All message types are unique, i.e., one does not need to imply message types based on usage. Message types could be reused for messages which are never sent on the same time slots, but experience has shown that this more error prone, both in design and in data analysis.

Commands and reports are maintained intact from source to destination, e.g., the speed command and break and acceleration command are formatted into a 64 bit packet by the speed code select function and relayed without modification to the train ATC. This approach reduces the chances for error introduction in the relay process.

An exemplary message catalog for the system 50 is set forth in Tables II–IV. Of course, this catalog is merely one example; the particular application requirements will dictate specific messages.

TABLE II

| NETWORK MESSAGES | | |
|---|---|---|
| Network Messages | Source | Destination |
| Network Acquisition Message | New entrant RS | RS in network |
| Network Acquisition Response Message | RS in network | New entrant RS |
| Network Synchronization | Station RS | Wayside RS |

TABLE II-continued

| NETWORK MESSAGES | | |
|---|---|---|
| Network Messages | Source | Destination |
| Message Interstation Message | Station A Computer | Station B computer |
| Command message | Station Computer | Any RS |
| Null Command | Net Management | Any RS |
| Bus assignment command | Net Management | Any RS |
| Radio Set command | Net Management | Any RS |
| Train assignment command | Net Management | VRS |
| Train ID assignment command | Central Control | Train ATC |
| Train destination command | Central Control | Train ATC |
| Break & acceleration command | Speed Code Sel | Train ATC |
| Speed command | Speed Code Sel | Train ATC |
| Report message | Any RS | Station computer |
| Null Report | Any RS | Net Management |
| Contact report | SRS or WRS | Net Management |
| TOA report | Any RS | Any RS |
| Range report | Any RS | Position Tracking |
| RS status report | Any RS | Net Management |
| Link status report | Any RS | Net Management |
| Faults & Alerts report | Any RS | Net Management |
| Train contact report | Any RS | Net Management |
| Vehicle ATC report | Train ATC | Net Management |
| Train ID & destination report | Train ATC | Central Control |
| Direct & Indirect ATC report | ATIC | Net Management |
| Distance Past Shunt report | ATIC | Position tracking |

TABLE III

| STATION TO TRAINS DATA | | | |
|---|---|---|---|
| Function | Bits | Command | Field Name |
| Vital speed command | 7 | Speed Command | Vital speed command |
| Non-vital speed command | 7 | Speed Command | Non-vital speed cmd |
| Program stop override | 1 | Speed Command | Program stop override |
| Door open command | 1 | Brake/acceleration cmd | Door open cmd |
| Braking effort command | 5 | Brake/acceleration cmd | Braking effort |
| Acceleration command | 5 | Brake/acceleration cmd | Acceleration |
| Destination command | 10 | Train destination cmd | Destination |
| Train ID assignment | 12 | Train ID assignment cmd | Train ID |

TABLE IV

| TRAINS TO STATION DATA | | | |
|---|---|---|---|
| Function | Bits | Command | Field Name |
| Train position | [1] | Range report | |
| Car ID | 12 | ATIC report&msg header | Train car ID [2] |
| Rear car ID | 12 | ATIC report&msg header | Train CAR ID |
| AATC equipment status | 4 | ATIC report | AATC equipment status |
| Propulsion signal | 5 | Vehicle ATC report | Propulsion signal |
| Train ID | 12 | Train ID/destination rpt | Train ID |
| Train destination | 10 | Train ID/destination rpt | destination |
| Door status | 1 | Vehicle ATC report | Door status |
| Number of brake cutouts | 5 | Vehicle ATC report | Number of brake cutouts |
| Track signal speed cmd | 3 | | |
| Track signal freq pair | 3 | Vehicle ATC report | Track signal freq. pair |
| Distance traveled since last frequency change | 8 | Distance past shunt report | Distance traveled past shunt |
| Previous msg integrity | 4 | Distance past shunt rpt | Redundancy indicator & Mott |
| Misc, equipment status | 8 | ATIC report | ATIC Equipment status |

[1] Range reports form the basis for position calculations by the control station computer
[2] Each ATIC (automatic train interface controller) alternately reports its won car ID and the other car ID. The Report message header contains the vehicle radio set's ID, which is the same as the train car ID.

The system employs network management functions to perform inbound message processing, network scheduling, and outbound message processing, as illustrated in FIG.1. The network management function is responsible for processing all inbound messages that are received at the control station radio set (SRS) from wayside (trackside) radios sets (WRSs) or vehicle radio sets (VRSs). Inbound messages may contain train contact reports, vehicle automatic train control (ATC) reports, range reports, and various other equipment reports. The network management function first performs error checking with the CRC codes contained in the messages. The network management function annunciates any faults contained in equipment reports to central control, updates train status information, and forwards range reports to the position location function. Contact reports are used for network scheduling.

A representative network design could be 512 times slots per second. As part of the network management function, half of these 512 time slots are designated the A buss and the other half of these 512 time slots are designated the B buss. The two data buss approach is used for flexibility of assigning transmission time slots to radios which are in separate tunnels leading to the same control station, such as in the case of merging tracks.

A typical update rate for speed commands is every half second. Thus, radios on the train, at the trackside, and at the controls station are given time slot assignments which repeat every half second. This half second repetition interval is called a frame. Thus, each frame on each buss contains 128 time slots. As part of the network management process, each fame is further partitioned into 16 windows; each window contains 8 time slots. Typically, half of the time slots in a given window are used for speed commands outbound from the control station to the trains and the other half of the time slots in a window are used for position and status reports inbound to the control stations from the trains and trackside radios. In this example, there are 15 reporting opportunities (windows) on each data buss each half second period (frame). For clarity of transmission and reception, each window of time slots can be, but do not need to be, on a separate frequency channel.

The network management function performs network scheduling by issuing commands to radio sets instructing them when to transmit messages and when to receive messages. The network management function is responsible for initializing the data busses which comprise a series of RF links originating with the SRSs and extending outward with the WRSs. Upon start up, the SRSs listen for contact reports from adjacent WRSs and upon receipt, the network management function issues a buss assignment command for the WRS. The buss assignment command indicates whether the assignment is for the A or B bus, the relay level (0–31) for the WRS, and RF channels for the bus. As the control station continues to receive contact reports from active WRSs, the network management function issues bus assignment commands, building the buss outward from the control station. If a scheduled message is not received, the network management function issues a request for status from the suspect radio set.

The network management function is also responsible for scheduling and issuing train assignment commands to VRSs. Upon receipt of a train contact report from a WRS, the network management function schedules a train assignment and issues the command. The train assignment command instructs the VRS which window to transmit (0–15 each buss) and assigns a report rate indicating how often to transmit (every frame, every other frame, etc.) Under normal operations, each VRS is given a report rate of every frame. However, if there are more than the expected number of trains per control zone, network management can instruct each VRS to transmit at a less frequent rate.. Due to the inherent redundancy of the system, the control station will still receive a report from each train every frame under reduced rate conditions.

The network management function builds outbound messages. Outbound messages may contain speed commands, train ID and destination commands, inter-station messages, or various radio set commands. Speed commands are received from the speed code selection function and are packaged (unaltered by net management) in a command message. The network management function computes a CRC code for each command message as error protection. The network management function transfers messages to its SRSs every window for transmission to the destination radio set.

Figures 12, 13:
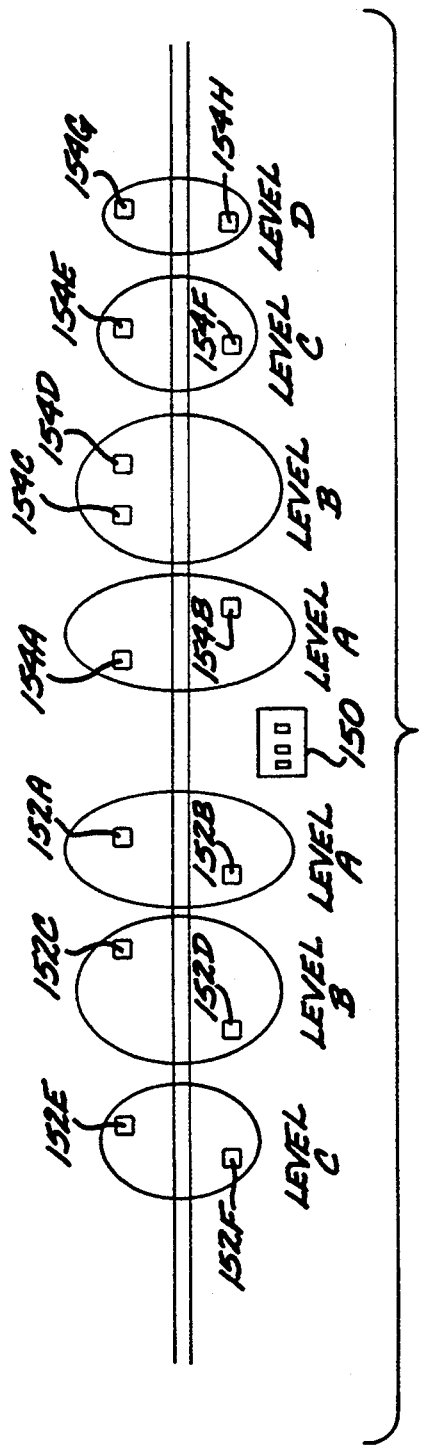
FIG. 12 illustrates generally the relaying of signals from one trackside radio to the next.
FIG. 13 represents an exemplary time slot budget by function, to provide a guaranteed one-half second response time.

Participants are uniquely assigned one or more time slots within which to communicate. With only one transmission per time slot, vital control information is communicated reliably and conflict-free. The time slot allocation chosen to size the outbound and inbound traffic, for this example, will nominally support eight trackside radios at direct through triple relays away from the control station as shown in FIG. 12. Thus, a direct relay in this example (level A) is from the SRS 150 directly to WRSs 152A, 152B, 154A, 154B, which are all within direct transmission range of the SRS 150. A level B relay occurs when a WRS in level A relays a message between the SRS 150 and a WRS 152C, 152D, 154C, 154D in level B. A level C relay occurs when a WRS in level A relays a message between the SRS and a WRS in level B, which in turn acts to relay the message between the particular WRS 152E, 152F, 154C, 154D in level C. A level D relay can be used to relay messages between WRSs 154G, 154H in level D and the SRS 150.

A representative time slot budget by function is shown in FIG. 13. With this representative design of 768 time slots with a guaranteed response time of every half second, the network supports 20 trains per control zone.

With only one transmission per time slot, position location can be measured by elapsed time of routine communications within this time ordered, synchronous network. Ranging between all radios in the network, but principally between the train radios (VRSs) and trackside radios (WRSs), is possible by using a spread spectrum modulation for each individual transmission. Spread spectrum communications is well known in the art. An exemplary reference on the subject is "Spread Spectrum Communications," M. Simon, J. Omura, R. Scholtz and B. Levitt, Computer Science Press, Rockville, Md., 1985. In a direct sequence spread spectrum communication system, a wideband spreading signal is modulated onto a lower rate data signal. By synchronizing to the higher rate transmissions, time demarcations can be established. Elapsed transmission time equates to distance from the transmitter. This general process is illustrated in FIG. 14. The elapsed transmission time from a transmission from a WRS (unit 1) to a VRS (unit 2) during a given time slot N is measured as TOA1. During a subsequent time slot N+M, the elapsed transmission time from a unit 2 transmission to unit 1 is measured as TOA2. The time measurements are averaged to provide the average propagation delay used to calculate range from unit 1. Each radio set has a crystal oscillator which that radio set uses to maintain its own time base. In order to participate in network operations, all radio sets must be synchronized to a standardized master time. As an artifact of the manufacturing tolerances for components used in the hardware implementation, each crystal oscillator has a slightly different resonant frequency (in a particular exemplary embodiment, approximately 1 part in 1 billion), so over time the time bases and hence the start of time slots in different radios drift slightly relative to each other. Left uncorrected, this drifting could cause inaccuracies in the range measurement. By combining two time-of-arrival measurements in close time proximity, the instantaneous drift is zero so the longer term drift can be measured and accounted for. This longer term drift which is relative between two radios is called an offset, and is continually corrected for during normal network operation.

The higher the spreading rate, the greater the range resolution. A representative design would consist of 5 MHz spreading and 8 times over-sampling in the receiver correlators yielding a range measurement resolution of 25 feet. A direct sequence spreading rate of 5 MHz is readily increased to accommodate potential future requirements for greater location resolution than 25 feet. The Time of Arrival (TOA) range measurements are processed into positions along the track using the algorithms shown in FIG. 15. These positions are then supplied to the speed selection function for determination of the movement commands which are subsequently transmitted by the control communication function.

FIG. 15 shows the general algorithm flow for determining the train positions from the time of arrival measurements. Typically, this processing occurs at the control stations, although it could also be performed at the WRSs. At step 172, the time of arrival measurements relayed from the various WRSs are converted into ranges from the respective WRSs. The range information is filtered at step 174 using GDOP (geometric dilution of precision tables 176) in a conventional manner to compute the train position. This position is then validated and resolved (step 180) using the track position table 182. The resulting vehicle position is then provided to the database and a control console display.

Position location algorithms developed for battlefield position location and tracking systems are known, e.g., for the Enhanced Position Location and Reporting System (EPLRS), which automatically calculate and report to commanders the position location of manpack, vehicle and airborne units in the forward battlefield area. The algorithms required for the position location of trains are typically not as complex as those required for battlefield applications because the known track locations can be integrated to simplify the algorithms. Since both the track and Wayside Radio Set (WRS) locations are known to a great accuracy (i.e., surveyed), the train location along the track can be easily determined from range measurements collected using the WRS locations as reference points. The track location information will be stored by track segments. Track segment boundaries will depend on the characteristics of the track such as curvature and RF propagation properties. A WRS will be placed at approximately every other track segment boundary.

Figure 16:
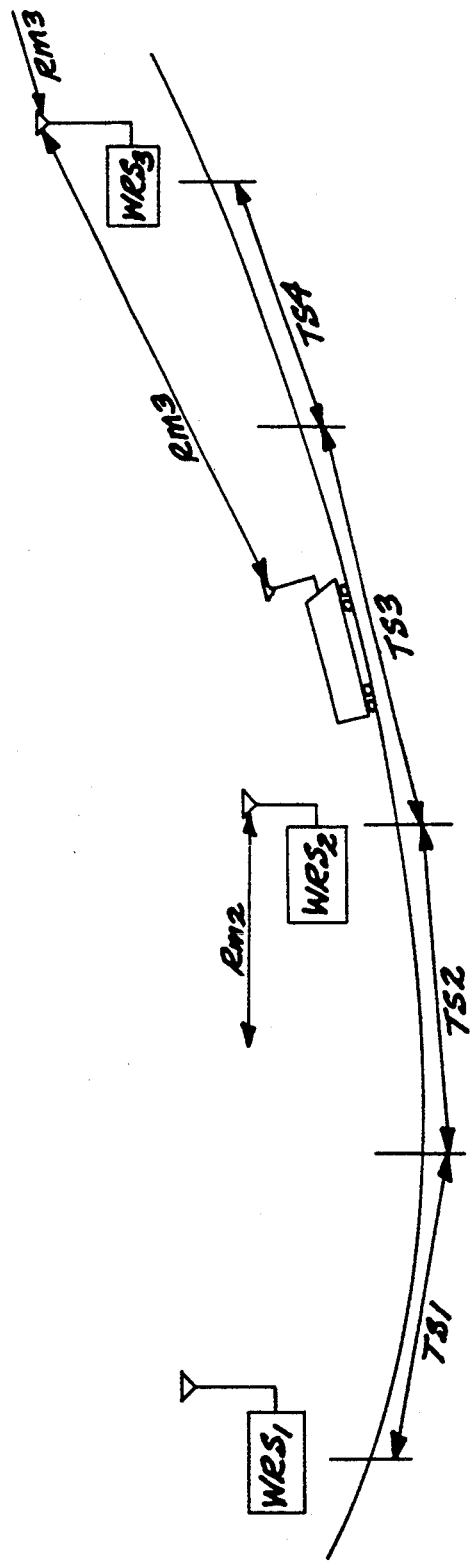
FIGS. 16 and 17 depict range measurements of trains in the system of FIG. 1.

FIG. 16 shows a section of track consisting of four track segments TS1-TS4 and a train 200 occupying segment number three. The train has not been previously located. In this case, at least two range reports are required to locate the train. In this example, WRS$_2$ reports a range measurement for the train (R$_{m2}$), and WRS$_3$ reports a range measurement for the train (R$_{m3}$). Both range reports are used to determine the unique track segment occupied by the train 200. A train position is then computed for each range measurement as a second order, piece-wise linear approximation which is a function of the measured range (R$_m$) from the WRS. The approximation is based on a unique, predetermined RF propagation model between the reporting WRS and the occupied track segment. The train position, P$_R$, is then computed as a combination of the positions based on each WRS.

Figure 17:
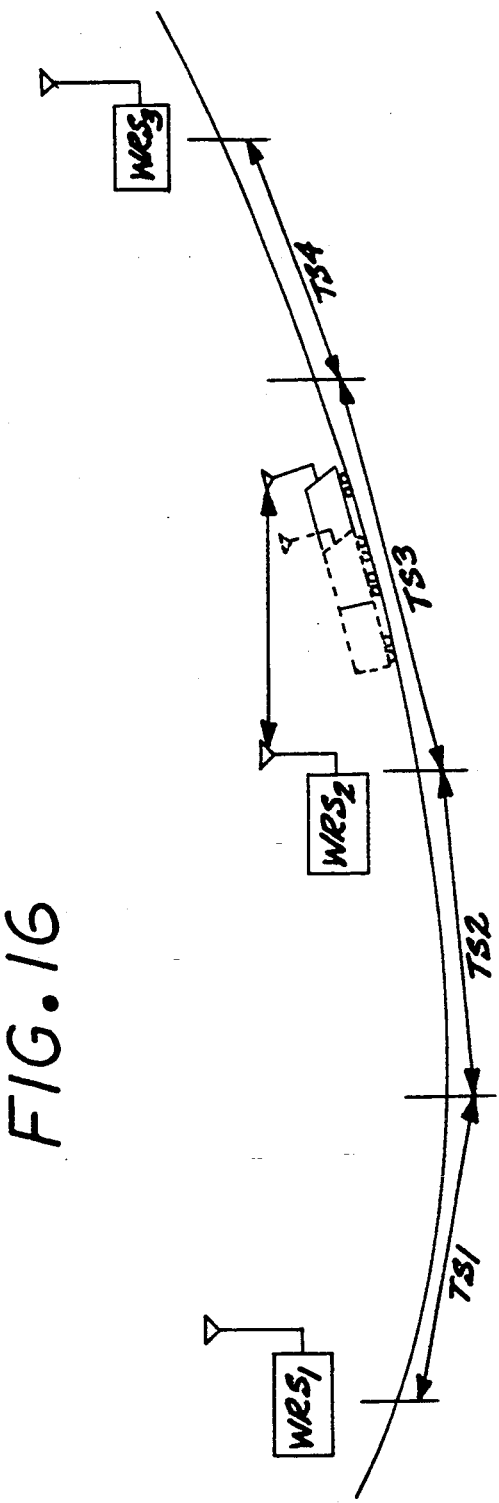
Figure 18:
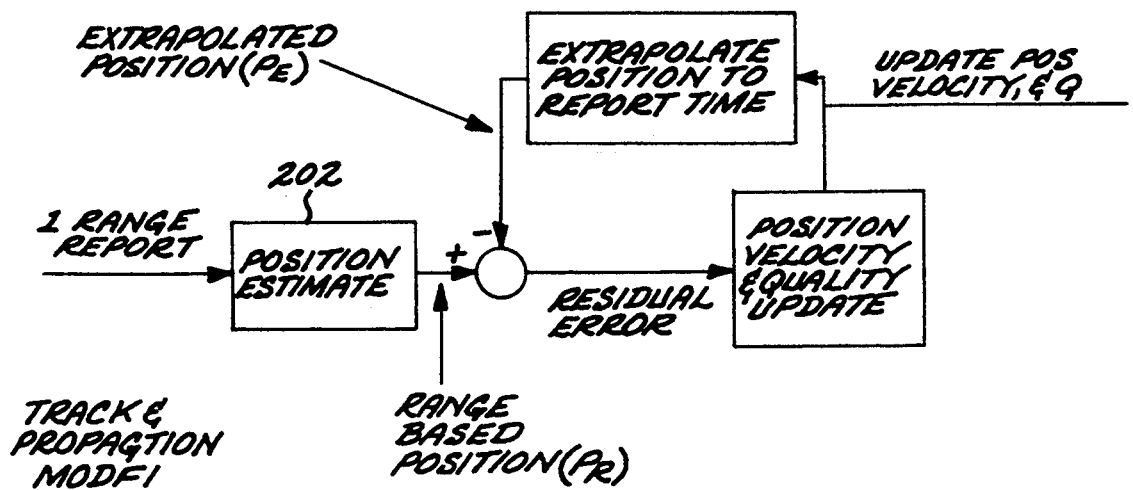
FIG. 18 is a schematic block diagram of a predictor-corrector filter employed to determine train position.

In the example shown in FIG. 17, the train 200 has been previously located, and an extrapolated train position is used to determine the occupied track segment. The train position based on range, P$_R$, is then computed as a function of the range measurement (R$_m$) as explained above. The range position is then input to a predictor-corrector filter to determine the train position update report, as shown in FIG. 18. Here, the one range report is fed to a position estimation function 202, which employs the track and RF propagation models to estimate the train position. The train tracking filter employs a simplified version of the discrete Kalman filter which requires that in addition to the estimates of position and velocity, an error covariance matrix reflecting the quality (uncertainty) of these estimated be computed. In this manner, each source of information is assigned a proper degree of importance. The resultant filters can also be termed adaptive predictor corrector filters.

A very poor measurement leaves the train position uncertainty unchanged or even increased while a low range measurement uncertainty combined with a high train position uncertainty reduces the train's position uncertainty of that of the measurement. For train tracking the trackside radio sets positions are assumed to have positional uncertainty much less than that of the measurements, and it is thus assumed to be zero.

The train tracking subsystem will compute an quality indicator for P$_R$ based on the quality associated with each range report used as well as the consistency between position estimated obtained from more than one range measurement. The position update is based on the ratio of the extrapolated position quality to range position quality.

Figure 19:
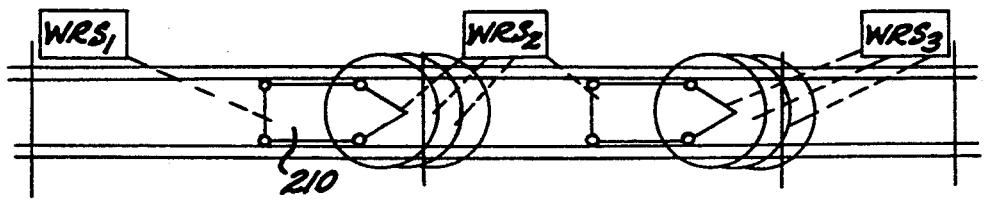
FIG. 19 is a schematic diagram illustrative accurate position determination using sparse communication device placement in accordance with the invention.

Prior art train control systems estimate train location by determining block occupancy often by using hardware fixed on rails. This and other prior art approaches limit position resolution to the block length in the range of 100 feet but more routinely 1000 feet due to installation costs. This invention allows the positions to be calculated multiple times per fixed block in real time as shown in FIG. 19. Because this invention neither relies on direct contact between the train and hardware attached to the rails nor relies on sensor placement at intervals equivalent to the resolution required, this approach can be applied to moving block or virtual block control systems. In moving block designs, block representations surrounding each trains are stored in computerized data bases in the speed selection function. In virtual block designs, block representations for each section of track are stored in computerized maps within the speed selection function. In either case, the computerized versions are easily refined to suit changing operational requirements or physical track layouts. However, these cases require the precision provided by this invention to be viable.

Figure 20:
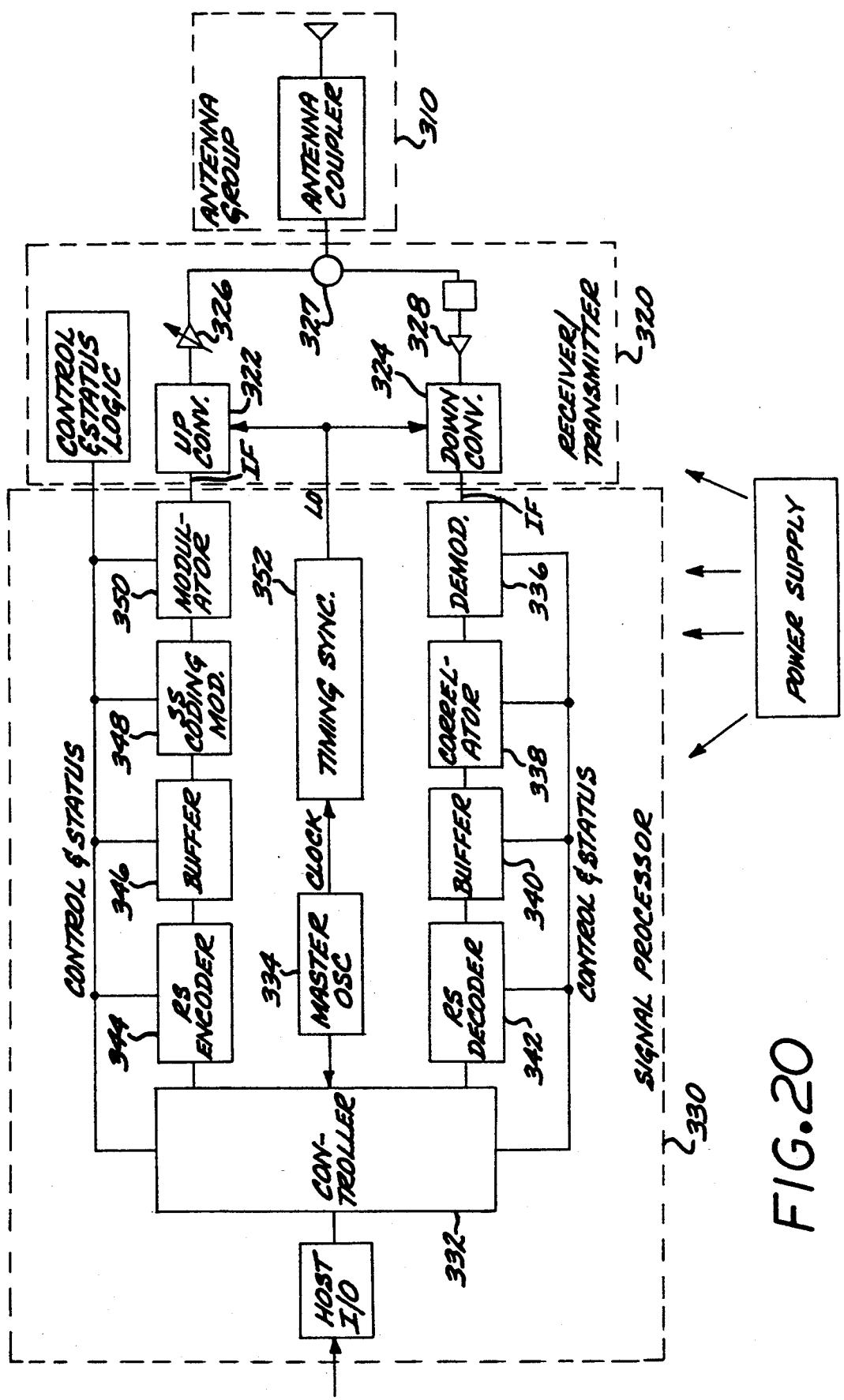
FIG. 20 is a schematic block diagram of an exemplary spread spectrum radio for performing the communication and ranging functions of the system of FIG. 1.

As shown in FIG. 20, the core radio 300 which performs the communication and ranging functions for the SRSs, WRSs and VRSs has four primary elements: (1) an antenna unit 310, (2) a receiver/transmitter 320, (3) a signal processor 330, and (4) a power converter 360. This partitioning permits modular implementation of various configurations for the SRSs, WESs and VRSs based on a common radio. The antenna units 310 each incorporate the specialized requirements for each installation, such as, in the case of an antenna for a VRS, low clearances between train car roofs and tunnel ceilings.

The receiver/transmitter 320 provides the signal processor with access to the TDMA network via the RF transmissions. The receiver transmitter up-converter 322 and down-converter 324 perform the frequency translation to and from the various operational channel frequencies. Of the spread spectrum bands currently available, the 2.4 to 2.4835 GHz band has the best tunnel propagation characteristics reported in the technical journals. The receiver/transmitter 320 also includes a low power variable gain amplifier 326 at the upconverter output for power output from 100 milli-watts to 2 watts. The receiver/transmitter 320 further includes an amplifier 328 for amplifying the received signals.

The signal processing section 330 performs TOA measurements, time tracking, preamble correlations, data demodulation, message processing, host connections, built in test, and performance monitoring. A high speed microcontroller 332, e.g., a Motorola 68304, provides the required processing capability. A microprocessor controlled oscillator 334 with support logic provides the frequency and clock references critical for high performance ranging systems. The built-in DMA controllers in the 68340 device reduce processor loading associated with data transfers between the various hardware blocks. The processor 330 includes a demodulator 336 which demodulates the received signals at IF from the receiver/transmitter 320. A correlator 338 operates on the demodulated signals, and outputs the correlated data to a buffer 340. A Reed Solomon (RS) decoder 342 decodes the correlated data, and outputs the decoded data to the controller 332. The controller 332 provides data for a message to be transmitted by the radio to the RS encoder 344, which encodes the data and passes the encoded data to a buffer 346. The spread spectrum coding function (block 348) takes the data out of the buffer 346 at a 238 kilobit per second rate, in this example. Each data bit from the buffer is combined with 21 bits of PN spreading code at a 5 MHz rate. The combination of data and 5 MHz spreading code is then input to the modulator 350. Modulator 350 modulates the data into the spread spectrum format at IF, and the modulated IF signal is passed to the upconverter 322. Timing and synchronization functions are performed by circuits 352.

Figure 21:
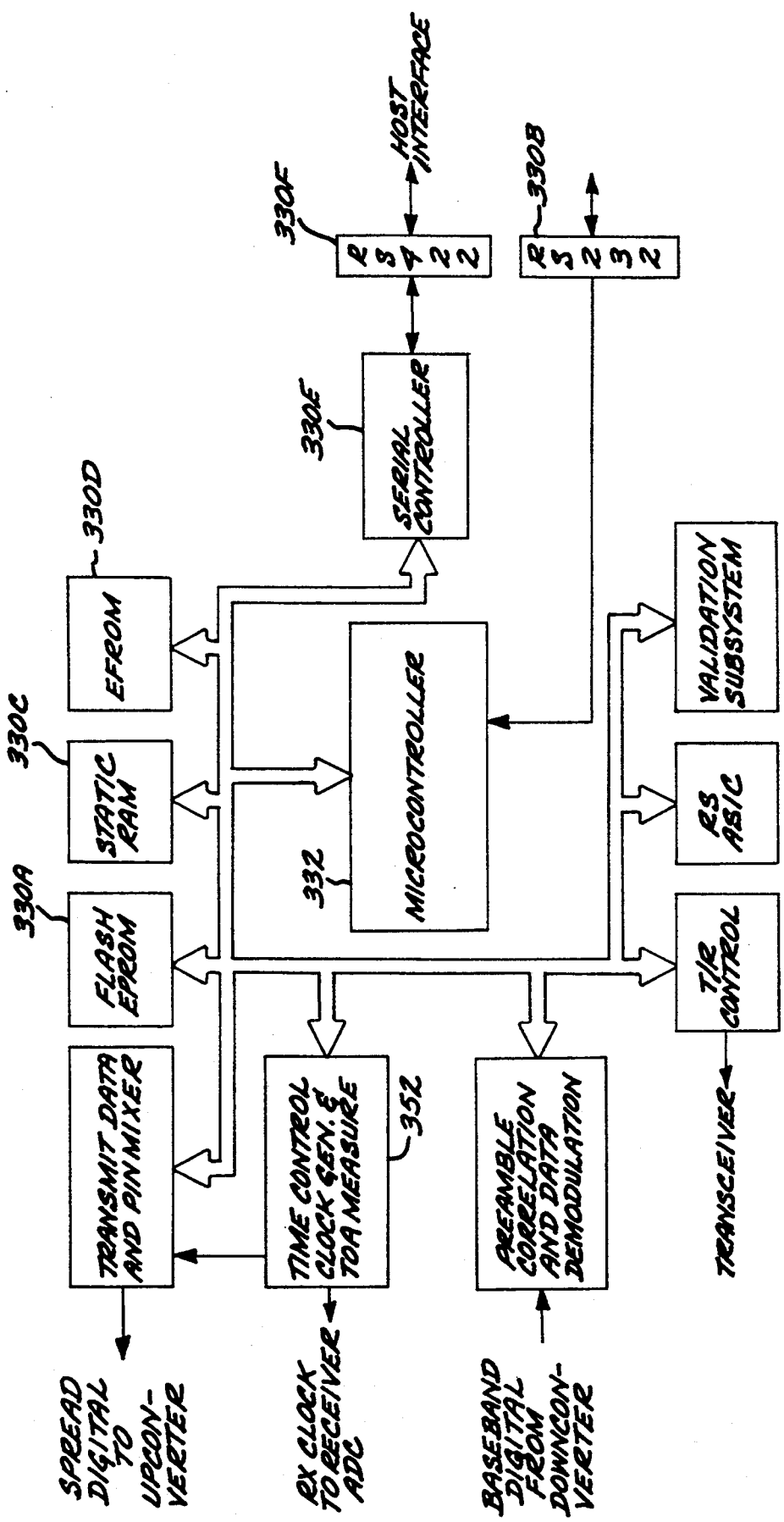
FIG. 21 illustrates the bus-oriented architecture of the core radio employed in the system of FIG. 1.

Major subsystems such as the Reed-Solomon encoder/decoder and the message authentication subsystem are attached to the microcontroller's bus rather than being placed in series with the incoming data stream from the demodulator. An exemplary embodiment of the signal processor's bus oriented implementation is shown in FIG. 21, and illustrates functions of the signal processor performed by the hardware components of FIG. 20. This architecture provides greater flexibility in the application of Reed-Solomon and message authentication coding, and does not cause a complete radio failure if one of these subsystems fails. The Flash EPROM 330A stores the program firmware code and allows for in-the-field updates of the code via the RS-232 download serial port 330B. The program code is transferred to the RAM 330C at power up which allows for faster execution of the program. System parameters and configuration information that may change during normal operation of the radio and must be maintained during power outages are stored in the EEPROM 330D.

Reed-Solomon encoding and decoding algorithms are preformed. Preamble correlation and demodulation of the received waveform are performed in a similar manner to that used on EPLRS. The message authentication function will be implemented in software, which provides a more versatile implementation allowing easier algorithm changes, e.g., on a TI TMS32C50 class fixed point DSP.

The TOA measurement and timing and control logic 352 consists primarily of clock generation and counter blocks. The required clock phases for time tracking are also generated by this logic. This logic contains the time slot timer and generates the appropriate receive and transmit windows.

A universal serial communications controller 330E is used to provide a general purpose RS-422 interface 330E that can be configured to various host requirements. This interface is capable of asynchronous and synchronous communications using internal or external clocks and standard RTS and CTS control lines. Synchronous communications to the radio controller up to 200 Kbps can be supported.

The receiver/transmitter 320 provides the RF signal processing required to provide the signal processor (operating at intermediate frequencies) access to the TDMA network. The RT functions include fixed frequency up-converter and downconverter, which interface to the signal processor at an intermediate frequency, and perform a frequency translation to/from the operational frequency. A low power variable gain amplifier 326 is provided to amplify signals for transmission. This amplifier is implemented as a Monolithic Microwave Integrated Circuit (MMIC). The low power amplifier operates at output power levels from 100 mW to 2 W, the value of which is programmable from the signal processor. This value is adjusted primarily to equalize the different losses from the radio to the antenna group for different configurations of the radio. A low noise amplifier 328 sets the sensitivity of the radio core, and provides required receive signal amplification prior to the relatively noisy downconverter. A transmit/receive isolation switch 327 is provided to protect the low noise amplifier front end from damage during the relatively high power transmit periods.

A microprocessor controlled crystal oscillator 334 provides the frequency and clock references for both the SP and the RT. A microprocessor controlled oscillator provides higher stability than temperature compensated crystal oscillators, critical for high performance ranging systems, and have extremely fast warmup periods, which drives the overall system startup time. Use of this technology results in a system having a low impact on the timing of the trains start up procedures.

Together, the network architecture and radio signal processor implement the robust communication processing which provides redundancy for the vital transfer of information from the speed selection function and the on-board train control units. WRSs are placed at ¼ mile intervals so that, given the transmitted power, triple levels of overlap overcome any single point failure of a radio. Time slots are allocated to each train and trackside radio such that range measurements and speed commands are redundantly communicated. Message processing includes error detection, error correction, and validation so that messages are only accepted after they are errorless and verified. The spread spectrum waveform provides ambient noise and interference rejection. Channelized transmissions within the spread spectrum band provides dynamic selection for the best reception. Two radios per train, direct sequence spreading, dynamic assignments, and relative motion between transmitters and receivers, all combine to nullify multipath. TDMA network coordination ensures contentionless access and rapid update rates. Security codes on all transmissions prevent system spoofing and sabotage.

Figure 22:
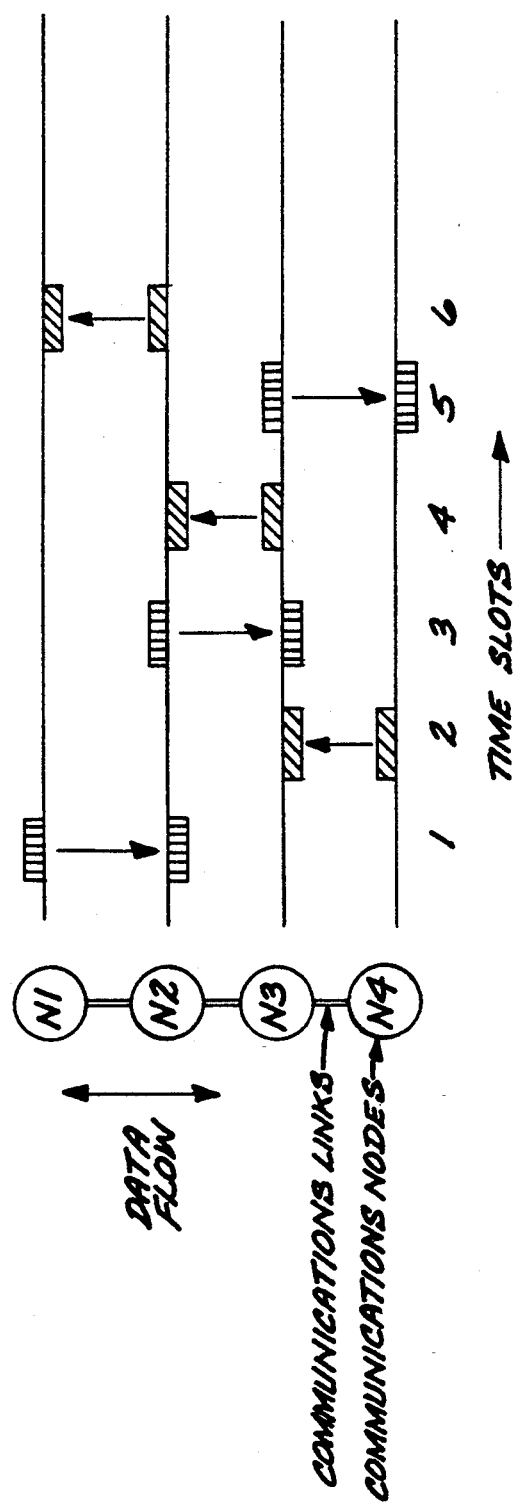
FIGS. 22-26 illustrate the time multiplexed data flow through the system of FIG. 1.
Figure 23:
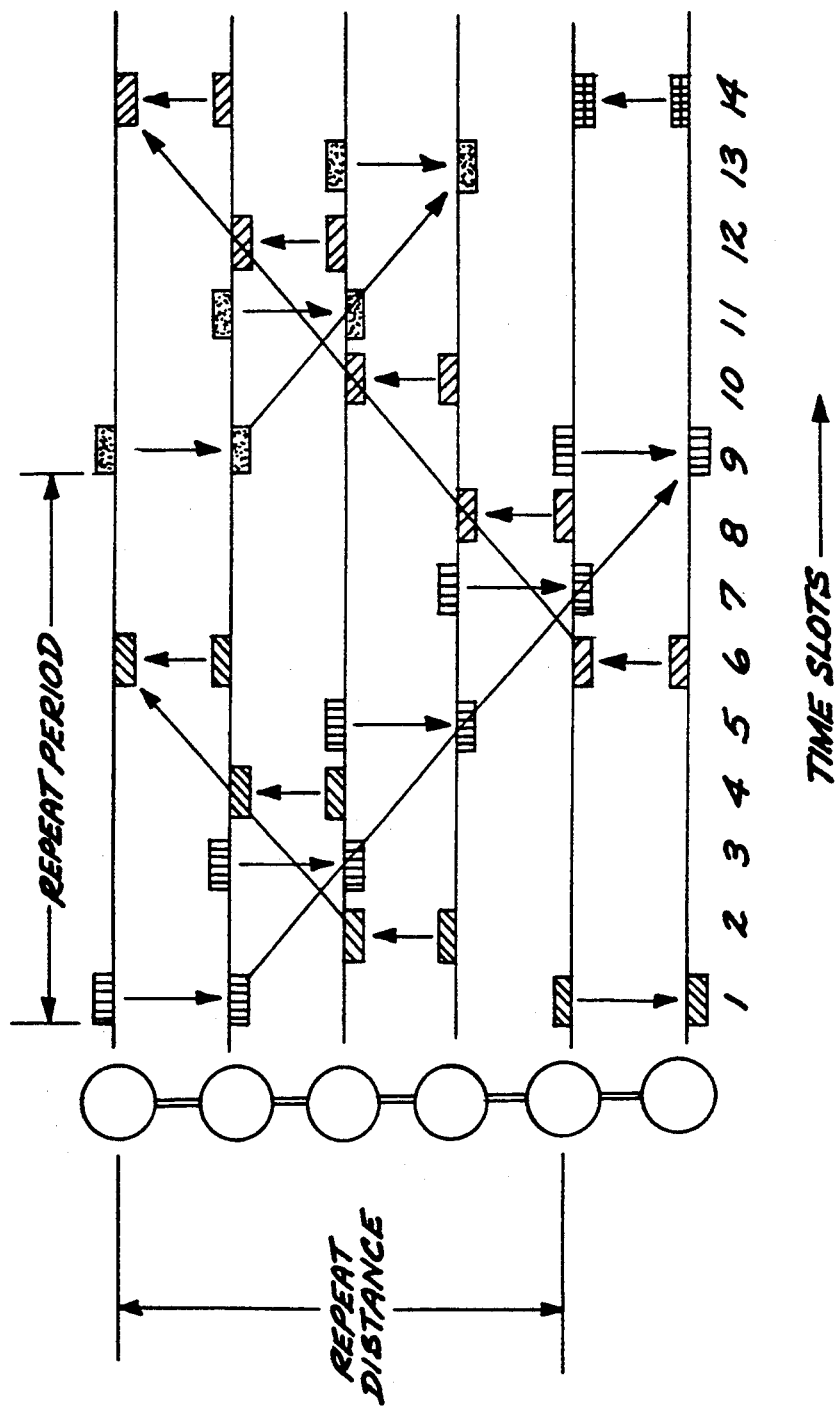

The TDMA network employs synchronous and interrogate-respond communications techniques, along with packetized data bus techniques. The communication devices in this exemplary network embodiment are spread spectrum RF wireless radios, i.e. the wayside radios, the on-board radios, and the control station radios. The network is a synchronous, time-slotted structure, wherein the time slot length(s) and sequencing are known to each of the communications devices. The network is characterized by an arrangement of coordinated time slot functional assignments, which provides for duplex data flow at each communication device. In each time slot, a communications device may either send or receive one data packet. Thus, in each time slot, one data packet is transferred from a communications device, i.e. a node, to an adjacent node. The same (or a modified) data packet is transferred to the next node in a later time slot. The data flows in both directions, in a time interleaved manner, to form a duplex data flow or data bus, as shown in FIG. 22. The data flow in each direction is repeated after several time slots. In the example of FIG. 23, the repeat period is eight time slots, and the corresponding repeat distance is four nodes. Each packet can be thought of as flowing at a diagonal in this two dimensional space, and the space between consecutive packets can be considered a moving window. The window size is then equal to the repeat period or the repeat distance. In some implementations, the repeat distance can be as short as two nodes.

Time, frequency or code multiplexing may, in a general sense, be used to control which pairs of devices are communicating in a given time slot.

Figure 24:
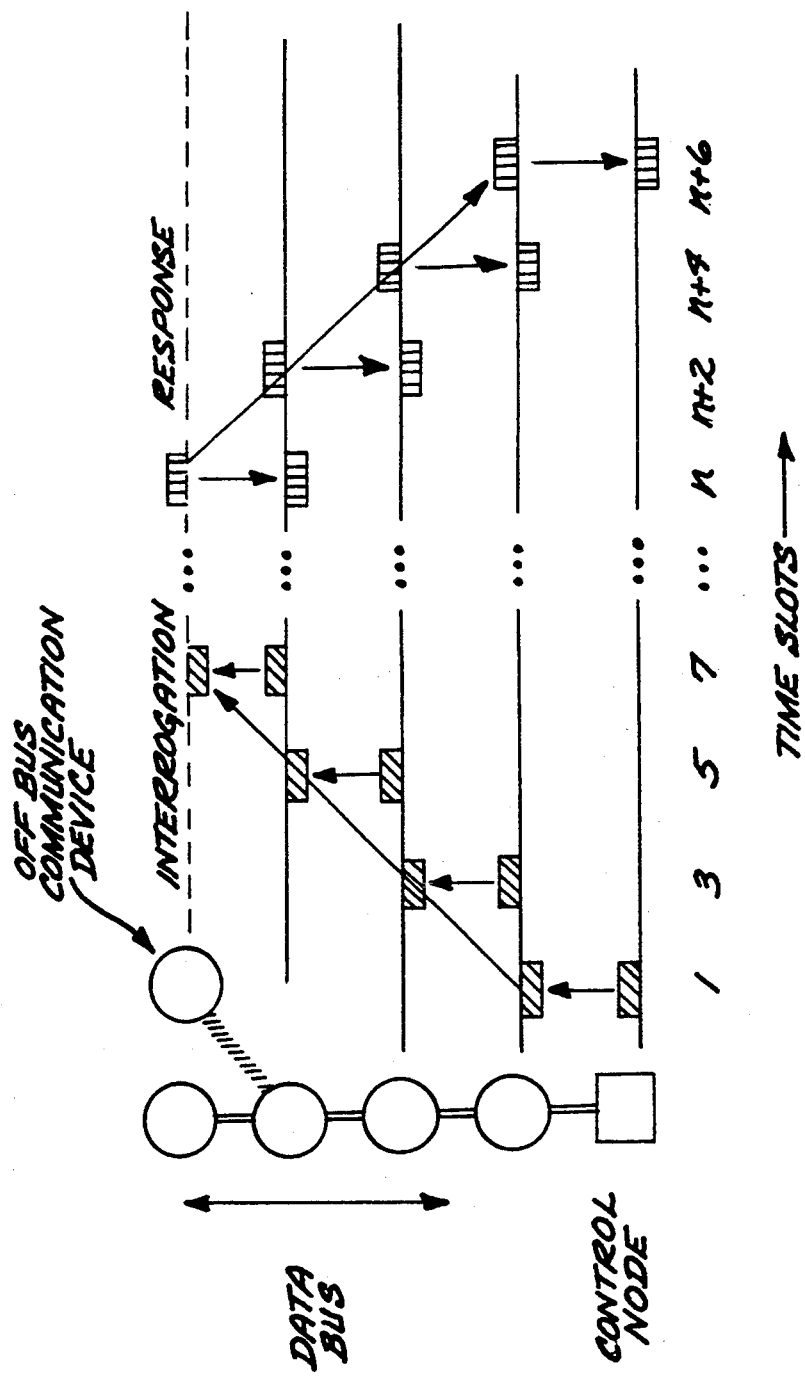

The communications network includes a means of interrogating and obtaining responses from the nodes, as well as from other communications devices which are not data bus nodes, e.g., control nodes. Control nodes can initiate an addressed interrogation packet along the data bus to a node, and the node responds with a data packet, as shown in FIG. 24. Both the control node and the responding node initiate flow on the bus by sending a packet in a time slot that matches the synchronous transfer in the desired direction.

The network further is capable of acquiring and maintaining time synchronization. One exemplary mechanism for implementing this function can include the measurement of time of arrival of a code word transmitted by each previously synchronized node. The code can be included with the data packets, or it can be transmitted as a separate packet.

Figure 25:
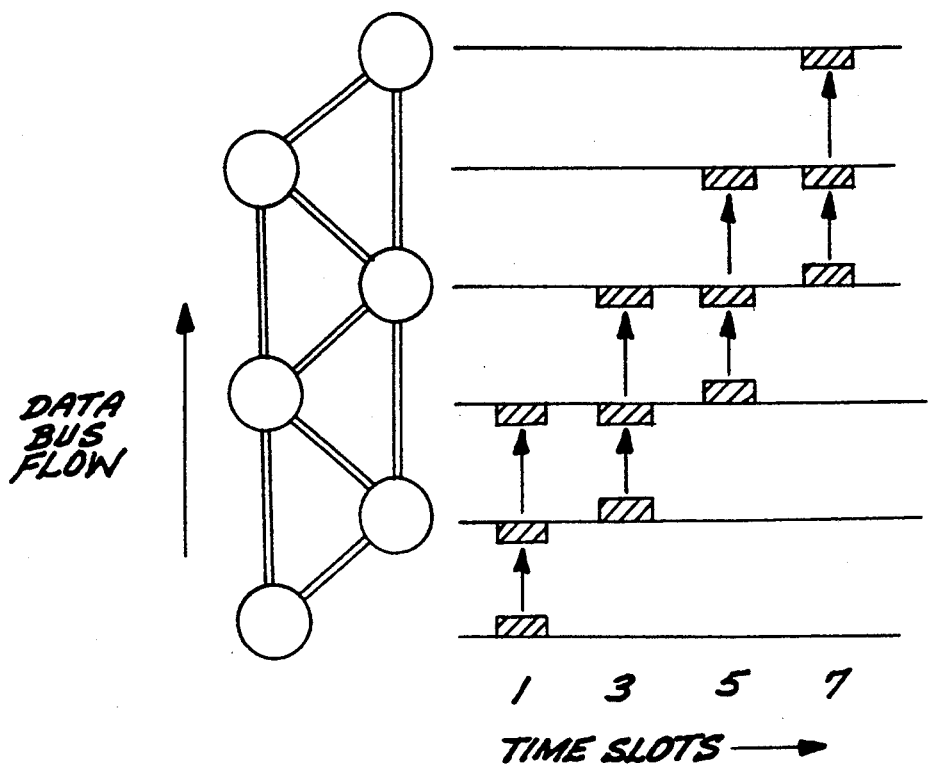
Figure 26:
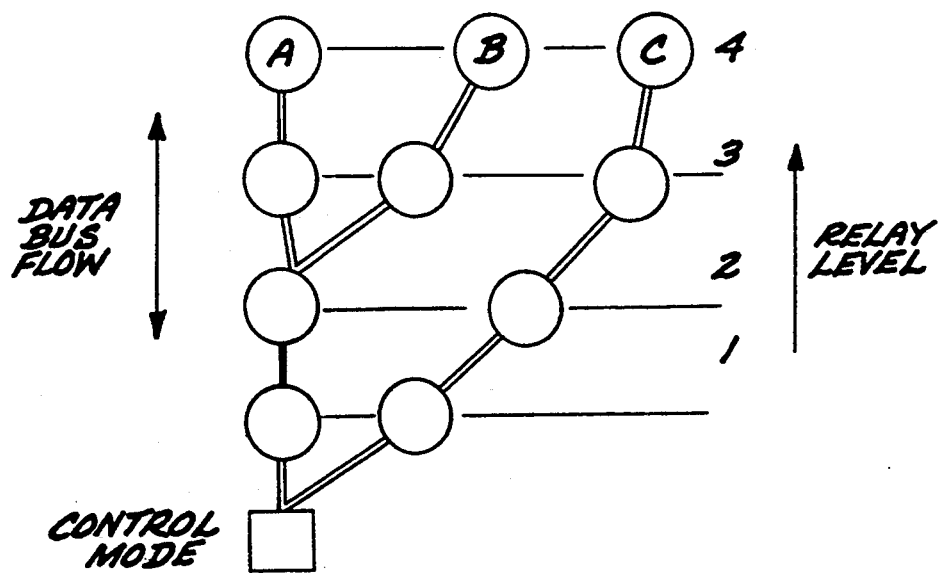

Two or more time division multiplexed data buses can use the same nodes; e.g., two independent control nodes can share a subset of the same nodes in a time division multiplexed fashion. Redundant data bus configurations can be employed, as illustrated in FIG. 25, for reliability. Branches data busses can be employed, as shown in FIG. 26. In this example, an interrogation addressed to node B would flow from the control node to nodes A, B and C at the fourth relay level. The routing at the branch points may be any combination of flooding, directed routing by indicators within the data packets, or pre-planned synchronous techniques.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. A system for determining real time location of trains moving along a fixed track system, comprising:
   a plurality of trackside wireless RF radio sets located in spaced relation at fixed, predetermined positions relative to said track system;
   at least one train-mounted wireless RF radio set located on each train;
   range determination means for determining the range location of said train in relation to one or more of said trackside radio sets, said means employing time of arrival detection and processing means to determine said range location from radio signal transmissions between said train-mounted and said trackside radio sets; and
   position determining means for determining the absolute position of said train along said track system from said range location and said predetermined positions of said trackside radios.

2. The system of claim 1 wherein said trackside radio sets and said train-mounted radio sets comprise spread spectrum radio sets.

3. The system of claim 1 wherein said trackside wireless radio sets and said train-mounted radio sets are time-synchronized to a master real time clock.

4. The system of claim 1 wherein said position determining means comprises a control station, said control station comprising a control station wireless RF radio set for RF wireless communication with said trackside radio sets to receive said range location data from said one or more trackside radio sets, and processing means for fixing the real time location of said train from said range location and said known location of the trackside radio set in relation to which said range location is determined.

5. The system of claim 4 wherein trackside radio sets, said train-mounted radio sets and said control station radio set each comprise spread spectrum radio sets.

6. The system of claim 5 wherein said fixed track system is divided into a plurality of track zones, and wherein a predetermined group of trackside radio sets and a zone control station are disposed within each zone, wherein each zone control station determines the real time position of trains traversing a portion of said fixed track section located within said zone.

7. The system of claim 6 further comprising a control center station, comprising a spread spectrum, center control wireless RF radio set for communicating with each of said zone control stations to monitor train locations throughout said track system.

8. The system of claim 1 wherein said trackside radio sets are installed at intervals along said track system which are at least one-quarter mile in length.

9. The system of claim 6 wherein said train radio sets, said trackside radio sets and said train-mounted radio sets comprise a collection of spread spectrum radio sets participating in a time-synchronized, time division multiple access (TDMA) communications network.

10. The system of claim 9 wherein each of said radio sets is assigned a particular time slot to send or receive messages within said network.

11. A system for controlling a train along a fixed track system via spread spectrum, wireless communication links, comprising:
a control station comprising a control station wireless RF radio set for RF communication with said trackside radio sets, said station further comprising means for generating train control command and spread spectrum encoding means for encoding said command onto RF signals transmitted by said control station radio set;
a plurality of trackside wireless RF radio sets located in spaced relation at fixed, predetermined positions relative to said track system;
at least one train-mounted wireless RF radio set located on said train;
wherein said trackside radio sets comprise means for relaying said encoded RF signals transmitted by said control station radio set to said train-mounted radio set, said trackside radios are dispersed over said track system so as to enable communication between said control station and said train over said track system, and said train-mounted radio set comprises means for decoding said commands and providing said decoded commands to an on-board train control system.

12. The system of claim 11 wherein said trackside radio sets and said train-mounted radio set are time-synchronized to a master real time clock.

13. The system of claim 11 wherein said train-mounted radio set, said trackside radio sets and said control station radio set comprise a collection of spread spectrum radio sets participating in a time-synchronized, time division multiple access (TDMA) communications network.

14. The system of claim 13 wherein each said radio set is allocated a predetermined time slot within a time interval for sending or receiving messages.

15. The system of claim 11 wherein said train is further characterized by an automatic train control system, and wherein said decoded train control commands are provided to said automatic control system.

16. A vehicle location and control system employing spread spectrum radio communications, comprising:
a plurality of wayside wireless RF radio sets located at predetermined fixed locations throughout a route system traveled by said vehicle;
at least one vehicle-mounted wireless RF radio set located on each vehicle;
a control station comprising a control station wireless RF radio set, and means for generating vehicle movement control signals;
each said wayside, vehicle-mounted and control station radio set comprising spread spectrum modulating and demodulating means so as to provide the capability of transmitting and receiving spread spectrum encoded messages, and wherein said radio sets comprise a collection of spread spectrum radio sets participating in a time-synchronized, time division multiple access (TDMA) communications network, wherein said vehicle control commands are relayed from said control station to said vehicle radio set via one or more of said wayside radio sets;
range determination means for determining a range location of said vehicle in relation to one or more of said wayside radio sets, said means employing time of arrival detection and processing means to determine said range location from radio signal transmissions between said vehicle-mounted and wayside radio sets; and
position determining means for determining an absolute position of said vehicle from said range location and said predetermined positions of said wayside radios.

17. The system of claim 16 wherein each said radio set is assigned a predetermined unique time slot within a communication time interval for sending and receiving messages.

18. The system of claim 16 wherein said wayside radio sets further comprise said range determination means, and means for transmitting messages destined for said control station comprising range data specifying said range location of said vehicle, and wherein said control station further comprises said position determining means for determining said absolute vehicle position.

19. The system of claim 16 wherein said vehicle comprises a train moving over a fixed track system, and wherein said wayside radio sets are dispersed over said track system.

20. The system of claim 19 wherein each train carries a first radio set located at a front end of the train, and a second radio set located at a rear end of said train for redundancy.

* * * * *